(12) United States Patent
Watabe et al.

(10) Patent No.: US 6,498,426 B1
(45) Date of Patent: Dec. 24, 2002

(54) FIELD EMISSION-TYPE ELECTRON SOURCE AND MANUFACTURING METHOD THEREOF

(75) Inventors: Yoshifumi Watabe, Tondabayashi (JP); Yukihiro Kondo, Hirakata (JP); Koichi Aizawa, Neyagawa (JP); Takuya Komoda, Sanda (JP); Yoshiaki Honda, Kyoto (JP); Takashi Hatai, Neyagawa (JP); Tsutomu Ichihara, Hirataka (JP); Nobuyoshi Koshida, Kodaira (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/557,916

(22) Filed: Apr. 21, 2000

(30) Foreign Application Priority Data

| Apr. 23, 1999 | (JP) | ............................................. 11-115717 |
| Oct. 18, 1999 | (JP) | ............................................. 11-295953 |
| Oct. 18, 1999 | (JP) | ............................................. 11-295954 |

(51) Int. Cl.[7] ............................. H01J 1/00; H01J 1/05; H01J 1/14; H01J 19/06; H01J 9/04
(52) U.S. Cl. ................... 313/310; 313/311; 313/346 R; 445/24; 445/50; 445/51
(58) Field of Search ................................. 313/310, 311, 313/346 R; 445/24, 50, 51

(56) References Cited

U.S. PATENT DOCUMENTS

| 3,665,241 A | 5/1972 | Spindt et al. ................ 313/351 |
| 3,735,186 A | 5/1973 | Klopfer et al. ......... 313/346 R |
| 5,168,339 A | * 12/1992 | Yokotani et al. ............... 257/64 |
| 5,458,518 A | 10/1995 | Lee .............................. 445/24 |
| 5,894,189 A | 4/1999 | Ogasawara et al. .......... 313/310 |
| 5,990,605 A | 11/1999 | Yoshikawa et al. .......... 313/310 |
| 6,285,118 B1 | * 9/2001 | Hatai et al. .................. 313/310 |

FOREIGN PATENT DOCUMENTS

| EP | 0798761 | 10/1997 | |
| EP | 0874384 | 10/1998 | |
| EP | 0989577 | 3/2000 | |
| JP | 06244460 A | * 9/1994 | ........... H01L/33/00 |
| JP | 8250766 | 9/1996 | |
| JP | 9259795 | 10/1997 | |
| JP | 10269932 | 10/1998 | |

OTHER PUBLICATIONS

An English Language abstract of JP 8–250766.
An English Language abstract of JP 9–259795.
An English Language abstract of JP 10–269932.

* cited by examiner

Primary Examiner—Nimeshkumar D. Patel
Assistant Examiner—Mariceli Santiago
(74) Attorney, Agent, or Firm—Greenblum & Bernstein, P.L.C.

(57) ABSTRACT

A field emission-type electron source (10) is provided with a conductive substrate (1), a semiconductor layer formed on a surface of the conductive substrate (1), at least a part of the semiconductor layer being made porous, and a conductive thin film (7) formed on the semiconductor layer. Electrons injected into the conductive substrate (1) are emitted from the conductive thin film (7) through the semiconductor layer by applying a voltage between the conductive thin film (7) and the conductive substrate (1) in such a manner that the conductive thin film (7) acts as a positive electrode against the conductive substrate (1). The semiconductor layer includes a porous semiconductor layer (6) in which columnar structures (21) and porous structures (25) composed of fine semiconductor crystals of nanometer scale coexist, a surface of each of the structures being covered with an insulating film (22,24). Further, an average dimension of each of the porous structures (25) in a thickness direction of the semiconductor layer is smaller than or equal to 2 $\mu$m.

23 Claims, 14 Drawing Sheets

FIELD EMISSION-TYPE ELECTRON SOURCE AND MANUFACTURING METHOD THEREOF

BACKGROUND OF THE INVENTION

1. Field of the Invention

The present invention relates to a field emission-type electron source using semiconductor materials, for emitting electron beams by means of electrical field emission, and to a manufacturing method thereof, the electron source being applied to a plane light-emitting apparatus, a display, a solid vacuum device and so on.

2. Description of the Prior Art

As a field emission-type electron source, conventionally, there has been known a Spindt-type electrode which is disclosed, for example, in the U.S. Pat. No. 3,665,241 and so on. The Spindt-type electrode is provided with a substrate on which many emitter chips of triangular pyramid shape are disposed, and a gate layer having emitting holes for exposing apexes of the emitter chips to the outside, the gate layer being disposed so as to be insulated to the emitter chips. The Spindt-type electrode can emit electron beams from the apexes of the emitter chips to the outside through the emitting holes by applying high voltage between the emitter chips and the gate layer under a vacuum atmosphere in such a manner that the emitter chips act as negative electrodes against the gate layer.

However, in the Spindt-type electrode, there exists such a problem described below. That is, the manufacturing process of the electrode is complicated, and further it is difficult to construct many emitter chips of triangular shape with higher efficiency. In consequence, if it is applied, for example, to a plane light-emitting apparatus, a display and so on, it may be difficult to enlarge the area of the electron-emitting surface.

Meanwhile, in the Spindt-type electrode, there exists also such another problem described below. That is, in the Spindt-type electrode, the electrical field converges to the apexes of the emitter chips. In consequence, if the degree of vacuum around the apexes of the emitter chips is lower so that residual gas exists thereabout, a part of the residual gas is ionized by the emitted electron beams to become positive ions. Because the positive ions collide to the apexes of the emitter chips, the apexes of the emitter chips suffer damages (for example, damages due to ion impacts). Therefore, the current density and efficiency of the emitted electrons may become unstable, or the lives of the emitter chips may be shortened.

In order to prevent the above-mentioned disadvantages, the Spindt-type electrode is required to use under a higher vacuum atmosphere (about $10^{-5}$ Pa to about $10^{-6}$ Pa. In consequence, there may occur such a disadvantage that the cost for sealing it with higher vacuum or for maintaining the higher vacuum, may be increased.

In order to improve the above-mentioned disadvantages, a field emission-type electron source of MIM (Metal Insulator Metal) type or MIS (Metal Insulator Semiconductor) type has been proposed. The former is a flat field emission-type electron source having a laminated structure of (metal)—(insulator film)—(metal) The latter is a flat field emission-type electron source having a laminated structure of (metal)—(insulator film)—(semiconductor). In order to elevate the electron-emitting efficiency of the above-mentioned type of field emission-type electron source (namely, in order to emit more electrons), it is necessary to decrease the thickness of the insulator film. However, if the insulator film becomes thinner to excess, it is feared that dielectric breakdown is caused when voltage is applied between the upper and lower electrodes of the laminated structure. Because there is a certain restriction on decreasing the thickness of the insulator film as described above, there may exist such a problem that its electron-emitting efficiency (electron extracting efficiency) can not be elevated so much.

Moreover, in recent years, as disclosed in the Japanese Laid-Open Patent Publication No. 8-250766, there has been proposed another field emission-type electron source (semiconductor element for emitting cold electrons), in which a porous semiconductor layer (porous silicon layer) is formed by performing anodic oxidation to a surface of a monocrystalline semiconductor substrate such as a silicon substrate or the like, and further a thin metal film is formed on the porous semiconductor layer. In the field emission-type electron source, electrons are emitted by applying voltage between the semiconductor substrate and the thin metal film.

However, in the field emission-type electron source described in the Japanese Laid-Open Patent Publication No. 8-250766, it is difficult to enlarge the area of the electron-emitting surface, because the monocrystalline semiconductor substrate is an essential constructive element. In consequence, it may not be suitable for applying to an apparatus which requests an electron source having a large electron-emitting surface area, such as a flat display apparatus. Meanwhile, in the Japanese Laid-Open Patent Publication No. 9-259795, there is disclosed a construction for achieving a flat type display based on the invention disclosed in the Japanese Laid-Open Patent Publication No. 8-250766.

In each of the above-mentioned field emission-type electron sources, electrons are emitted due to the electrical field produced by applying voltage to the both surfaces of the porous semiconductor layer. In this case, the porous semiconductor layer is composed of many fine pores and the remaining silicon particles while differing from the above-mentioned MIM or MIS. Hereupon, the porosity is 10 to 80%, while the inner diameter of each of the fine pores is 2 to several nm. In the above-mentioned Publication, there is such a description that because the number of atoms in the remaining silicon particles is several tens to several hundreds, an electron emitting phenomenon may be expected due to the quantum size effect. Meanwhile, in the Japanese Laid-Open Patent Publication No. 9-259795, there is such a description that because the electron emission occurs at a position which is very near with the surface of the porous semiconductor layer, it is desirable that the thickness is thinner, in consequence the practically usable range of the thickness may be 0.1 to 50 $\mu$m.

However, in the field emission-type electron source described in the Japanese Laid-Open Patent Publication No. 8-250766 or Japanese Laid-Open Patent Publication No. 9-259795, an electron popping phenomenon may be easily caused and further the amount of electrons emitted within the same plane may be easily dispersed. In consequence, if the electron source is applied to a plane light-emitting device or a display, There may occur such a disadvantage that the brightness dispersion or flicker of the screen may grow larger. Meanwhile, when the electron source is applied to the plane light-emitting device or the display, it is necessary to increase the amount of the emitted electrons. Hereupon, if it is intended to increase the amount of the emitted electrons by decreasing the thickness of the porous semiconductor layer, the above-mentioned disadvantages may grow much larger.

SUMMARY OF THE INVENTION

The present invention, which has been performed to solve the conventional problems described above, has an object to provide a field emission-type electron source, in which the popping phenomenon or in-plane dispersion of the emitted electrons hardly occurs while the amount of the emitted electrons and the electron-emitting efficiency are higher together, and to provide a manufacturing method of the electron source.

A field emission-type electron source according to the present invention which is preformed to achieve the above-mentioned object, includes (i) a conductive substrate, (ii) a semiconductor layer formed on a surface of the conductive substrate, at least a part of the layer being made porous, and (iii) a conductive thin film formed on the semiconductor layer, wherein (iv) electrons injected into the conductive substrate are emitted from the conductive thin film through the semiconductor layer by applying voltage between the conductive thin film and the conductive substrate in such a manner that the conductive thin film acts as a positive electrode against the conductive substrate. The field emission-type electron source is characterized in that (v) the semiconductor layer includes a porous semiconductor layer in which columnar structures and porous structures composed of fine semiconductor crystals of nanometer scale coexist, the surface of each of the structures being covered with an insulating layer, and (vi) the average dimension of each of the porous structures in the thickness direction of the semiconductor layer is smaller than or equal to 2 $\mu$m.

Because the thickness of each of the porous structures is smaller than or equal to 2 $\mu$m in the field emission-type electron source, the amount of emitted electrons may be highly stabilized, and further the amount of the emitted electrons may be increased. In consequence, the popping phenomenon, which is a large time-depending fluctuation of the amount of the emitted electrons, may not occur. Moreover, the in-plane dispersion of the amount of the emitted electrons may be reduced.

In order to apply the field emission-type electron source in various ways, it is essential to increase the amount of the emitted electrons. The present inventors have found that it is desirable that the thickness of each of the porous structures is smaller than or equal to 2 $\mu$m, in view of the amount of the emitted electrons of the field emission-type electron source.

Hereupon, the conductive substrate according to the present invention includes a semiconductor substrate in which a conductive region is formed by doping impurities into the substrate, and a substrate in which a thin metal film (bottom electrode) is formed on a surface of an insulating substrate such as glass plate.

In the above-mentioned field emission-type electron source, it is preferable that the thin film side end portions of the columnar structures and the thin film side end portions of the porous structures are located on the same position in the thickness direction of the semiconductor layer (namely, the height of the columnar structures being equal to the height of the porous structures at the conductive thin film side). In this case, because comparatively larger irregularity (namely, convex portions and concave portions) is not formed on the surface of the porous semiconductor layer, the conductive thin film of very small thickness formed on the surface of the porous semiconductor layer may cover the porous semiconductor layer with very high covering ratio in an electrically communicated state. In consequence, the porous semiconductor layer and the conductive thin film are electrically connected to each other. Further, because the covering ratio for the porous structures is higher, the necessary electrical field may be effectively applied to the porous structures. In consequence, its properties such as the amount of the emitted electrons or the electron-emitting efficiency may be efficiently improved.

In the above-mentioned field emission-type electron source, it is preferable that the porous semiconductor layer is composed of porous polycrystalline silicon formed by the anodic oxidation process. In this case, the columnar structures and the porous structures can be formed by a single step by performing the anodic oxidation to the polycrystalline silicon. Therefore, the manufacturing process may be simplified. Further, the formation or anodic oxidation of the polycrystalline silicon layer is advantageous for enlarging the area of the electron-emitting surface. Particularly, if there exist grains (columnar structures) which have grown to the columnar shapes, the pore formations progress along the grains. In this case, the angles of the porous structures in their depth direction become approximately perpendicular to the conductive substrate. In consequence, the electrical field in the porous structures becomes approximately perpendicular to the substrate. Because the emission of electrons is dominated by the electrical field in the porous structures, the electrons are emitted in the direction perpendicular to the substrate in this case. In consequence, the dispersion of the emitting-angles of the electrons is decreased so that a higher definition can be achieved when it is applied to a display or the like.

In the above-mentioned field emission-type electron source, it is preferable that the difference between the maximum dimension and minimum dimension of the porous structures in the thickness direction of the semiconductor layer is smaller than or equal to 0.5 $\mu$m (namely, the thickness dispersion of the porous structures being smaller than or equal to 0.5 $\mu$m). If the thickness dispersion of the porous structures is smaller, the electrical field applied to the porous structures is uniformed so that the in-plane distribution of the amount of the emitted electrons may be restrained. Particularly, when the columnar structures and the porous structures are provided to prevent occurrence of the popping phenomenon etc. and the thickness of each of the porous structures is smaller than or equal to 2 $\mu$m, an extreme dispersion of the intensity of the electrical field does not occur if the thickness dispersion of the porous structures is smaller than or equal to 0.5 $\mu$m. In consequence, the amount of the emitted electrons within the same plane may be comparatively uniformed.

In the above-mentioned field emission-type electron source, it is preferable that the thickness of the porous semiconductor layer is approximately equal to the thickness of the semiconductor layer disposed between the conductive thin film and the conductive substrate. In this case, the voltage loss does not occur in a portion which is not made porous. In consequence, the amount of the emitted electrons is increased when the same voltage is applied so that the electron-emitting efficiency may be elevated. Therefore, when the field emission-type electron source is applied to a display or the like, the electrical demand of the display may be reduced.

In the above-mentioned field emission-type electron source, it is preferable that an anticorrosive conductive layer, which has an anticorrosion against an electrolyte for the anodic oxidation process used for making the semiconductor layer porous, is provided on the surface of the conductive substrate at the semiconductor layer side. In this case, the conductive substrate (substrate itself or bottom electrode)

may not corroded by the electrolyte. In consequence, the electrical field is effectively applied to the porous structures so that the amount of the emitted electrons may not decreased. Further, it is prevented that an inferior element is produced due to a snap of the bottom electrode.

In the above-mentioned field emission-type electron source, it is preferable that a low-resistance layer of predetermined thickness is provided on the thin film side end portion of the porous semiconductor layer in the thickness direction of the semiconductor layer, the low-resistance layer having a lower resistance in comparison with other parts of the porous semiconductor layer. In this case, the low-resistance layer provided in the surface portion of the porous semiconductor layer acts as a mimic electrode. Therefore, even if the porous semiconductor layer does not partially contact to the conductive thin film, the electrical potential in the whole surface portion of the porous semiconductor layer is uniformed in the same plane. In this case, because the electrical field is uniformly applied into the porous semiconductor layer at the same plane, the dispersion of the amount of the emitted electrons at the same plane may be restrained. Therefore, when the field emission-type electron source is applied to a display, the bright dispersion on the screen may become smaller.

In the above-mentioned field emission-type electron source, it is preferable that the thickness of the low-resistance layer is smaller than the mean free path of the electrons in the semiconductor forming the low-resistance layer. In this case, the deterioration of the electron-emitting efficiency due to the low-resistance layer may be restrained.

In the above mentioned field emission-type electron source, the low-resistance layer may be composed of a low-porosity layer having a smaller porosity in comparison with other parts of the porous semiconductor layer. In this case, because the irregularity of the surface of the porous semiconductor layer becomes less, it may be restrained that the electrical field converges at the apexes of the convex portions or the bottom of the concave portions on the surface of the porous semiconductor layer. In consequence, when the field emission-type electron source is applied to a display etc., it may be prevented that only specific spots become bright. Further, the brightness dispersion in the same plane may become smaller.

In the above-mentioned field emission-type electron source, the low-resistance layer may be composed of a re-crystallized layer which is formed by re-crystallizing a surface portion of the porous semiconductor layer. In this case, the irregularity of the surface of the porous semiconductor layer becomes less so that it may be restrained that the electrical field converges at the apexes of the convex portions or the bottom of the concave portions on the surface of the porous semiconductor layer. In consequence, when the field emission-type electron source is applied to a display etc., it may be prevented that only specific spots become bright. Further, the brightness dispersion in the same plane may become smaller.

In the above-mentioned field emission-type electron source, the low-resistance layer may be composed of an impurity-implanted layer which is formed by implanting impurity ions into the porous semiconductor layer through a surface of the porous semiconductor layer. In this case, it may be easy to control the concentration or distribution of the impurity in the low-resistance layer.

In the above-mentioned field emission-type electron source, the low-resistance layer may be composed of an impurity-diffused layer which is formed by diffusing an impurity into the porous semiconductor layer through a surface of the porous semiconductor layer. In this case, it may be easy to enlarge the area of the electron-emitting surface in comparison with the case that the impurity is implanted by the ion implantation process.

In the above-mentioned field emission-type electron source, it is preferable that the thin film side surface of each of the porous structures is parallel to the surface of the conductive substrate. In this case, the electrical field in the porous structures is applied to the conductive substrate in the direction perpendicular to the substrate. In consequence, the electrons, which are emitted in the direction approximately perpendicular to the surface of the porous structure, are also emitted in the direction approximately perpendicular to the surface of the conductive substrate. As the result, the in-plane distribution of the emitting-angles of the electrons is further decreased. That is, the directions of the emitted electrons uniformly become perpendicular to that. In consequence, higher definition can be achieved when the field emission-type electron source is applied to a display or the like.

A method of manufacturing a field emission-type electron source according to the present invention is a process for producing the field emission-type electron source including (i) a conductive substrate, (ii) a semiconductor layer formed on a surface of the conductive substrate, which includes a porous semiconductor layer in which columnar structures and porous structures composed of fine semiconductor crystals of nanometer scale coexist, a surface of each of the structures being covered with an insulating film; and the average thickness of the porous structures being smaller than or equal to 2 $\mu$m; and (iii) a conductive thin film formed on the semiconductor layer, wherein (iv) electrons injected into the conductive substrate are emitted from the conductive thin film through the semiconductor layer by applying a voltage between the conductive thin film and the conductive substrate in such a manner that the conductive thin film acts as a positive electrode against the conductive substrate. The manufacturing method is characterized in that it includes the step of (v) making the semiconductor layer porous by means of an anodic oxidation process to form the porous semiconductor layer, wherein (vi) the thickness of the porous semiconductor layer is controlled by adjusting the depth of the semiconductor layer to be made porous by means of an amount of electric charges during a period that the semiconductor layer acts as a positive electrode in the step. According to the manufacturing method, the thickness of the porous semiconductor layer may be easily controlled by means of the electric charges during the anodic oxidation process so as to become a predetermined value.

In the above-mentioned method of manufacturing the field emission-type electron source, it is preferable that pulse current or pulse voltage is applied between the counter electrode and the conductive substrate on which the semiconductor layer to be made porous is formed in such a manner that a period that the conductive substrate acts as a positive electrode and a period that the current or voltage is off state are mutually set, while the thickness of the porous semiconductor layer is controlled by changing the amount of electric charges during the period that the semiconductor layer acts as the positive electrode. In this case, the thickness of the porous semiconductor layer may be easily controlled so as to become the predetermined value. Further, because the anodic oxidation process can be intermittently performed by the pulse treatment when the porous semiconductor layer of predetermined porosity is formed with larger current density, the rate of progressing the anodic oxidation can be set to a comparatively smaller value. Therefore, the thickness of the porous semiconductor layer may easily controlled in comparison with the case that the current is continuously fed.

In the above-mentioned method of manufacturing the field emission-type electron source, pulse current or pulse voltage may be applied between the counter electrode and the conductive substrate on which the semiconductor layer to be made porous is formed in such a manner that a period that the conductive substrate acts as a positive electrode and a period that the conductive substrate acts as a negative electrode are mutually set, while the thickness of the porous semiconductor layer may be controlled by changing the amount of electric charges per one pulse during the period that the semiconductor layer acts as the negative electrode. In this case, the pore formation in the semiconductor layer progresses when the semiconductor layer acts as the positive electrode, and while the condition of the pore formation disperses in accordance with the surface shape or state of the semiconductor layer. When the polarity is reversed then so that the semiconductor layer acts as the negative electrode, the electrical field converges at the portion where the pore formation has rapidly progressed so that carriers converge at the same portion. In consequence, a large amount of gas is produced at the portion by the electrolysis process. Thus, at the portion where the gas has been produced, the contact between the portion and the electrolyte is snapped so that the pore formation does not progress when the semiconductor layer acts as the positive electrode next. The above-mentioned steps are repeated so that the thickness of the porous structures is uniformed all over the plane. The degree of the uniformity can be controlled by means of the amount of the electric charges during the period that the semiconductor layer acts as the negative electrode. If the thickness of the porous structures is uniformed, the electron source, in which the in-plane distribution of the amount of the emitted electrons is extremely small, may be achieved.

Another method of manufacturing a field emission-type electron source according to the present invention is a process for producing the field emission-type electron source including (i) a conductive substrate, (ii) a semiconductor layer formed on a surface of the conductive substrate, which includes a porous semiconductor layer in which columnar structures and porous structures composed of fine semiconductor crystals of nanometer scale coexist, a surface of each of the structures being covered with an insulating film; and the average thickness of the porous structures being smaller than or equal to 2 $\mu$m; and (iii) a conductive thin film formed on the semiconductor layer, wherein (iv) electrons injected into the conductive substrate are emitted from the conductive thin film through the semiconductor layer by applying a voltage between the conductive thin film and the conductive substrate in such a manner that the conductive thin film acts as a positive electrode against the conductive substrate. In the manufacturing method, (v) a low-resistance layer of predetermined thickness is provided on a thin film side end portion of the porous semiconductor layer in the thickness direction of the semiconductor layer, the low-resistance layer having a smaller porosity and a lower resistance in comparison with other parts of the porous semiconductor layer. Further, the manufacturing method is characterized in that it includes the steps of (vi) forming the porous semiconductor layer by decreasing the porosity of a surface portion of the semiconductor layer in comparison with the porosity of other parts of the semiconductor layer, after the semiconductor layer has been formed on the conductive substrate, (vii) forming the porous semiconductor layer including the low-resistance layer by oxidizing or nitrifying the porous semiconductor layer, and (viii) forming the conductive thin film on the porous semiconductor layer. According to the manufacturing method, the low-resistance layer may be provided without independently adding another step for forming the, low-resistance layer. Moreover, the field emission-type electron source, in which the in-plane dispersion of the emitted electrons is smaller, can be achieved with a lower cost.

If the semiconductor layer is made porous by means of the anodic oxidation process in the above-mentioned method of manufacturing the field emission-type electron source, it is preferable that the current density is set to a smaller value during a predetermined initial period of the anodic oxidation process, and then the current density is increased after the predetermined initial period. During the anodic oxidation process, there exist an interrelation between the current density and the porosity. Meanwhile, the resistance changes in accordance with the degree of the porosity. Therefore, the resistance of the low-resistance layer can be controlled by controlling the current density.

When the semiconductor layer is made porous by means of the anodic oxidation process in the above-mentioned method of manufacturing the field emission-type electron source, the light power applied to the surface of the semiconductor layer may be smaller during a predetermined initial period of the anodic oxidation process, and then the light power may be increased after the predetermined initial period. During the anodic oxidation process, there exist an interrelation between the light power and the porosity. On the other hand, the resistance changes in accordance with the degree of the porosity. Therefore, the resistance of the low-resistance layer can be controlled by controlling the light power applied to the surface of the semiconductor layer.

If the low-resistance layer is composed of a re-crystallized layer formed by re-crystallizing a surface portion of the porous semiconductor layer in the above-mentioned method of manufacturing the field emission-type electron source, there may be provided a step for forming the porous semiconductor layer by making the semiconductor layer porous after the semiconductor layer has been formed on the conductive substrate, and another step for re-crystallizing the surface portion of the porous semiconductor layer by means of the laser anneal process, instead of the above-mentioned step of (vi) forming the porous semiconductor layer by decreasing the porosity of the surface portion of the semiconductor layer in comparison with the porosity of the other parts of the semiconductor layer after the semiconductor layer has been formed on the conductive substrate. In this case, the low-resistance layer can be easily provided, comparatively. Meanwhile, the field emission-type electron source, in which the in-plane dispersion of the emitted electrons is smaller, can be achieved with a lower cost.

Meanwhile, if the low-resistance layer is composed of an impurity-implanted layer formed by implanting impurity ions into the porous semiconductor layer in the above-mentioned method of manufacturing the field emission-type electron source, there may be provided a step for forming the porous semiconductor layer by making the semiconductor layer porous after the semiconductor layer has been formed on the conductive substrate, and another step for implanting the impurity ions into the porous semiconductor layer from the surface side of the porous semiconductor layer by means of the ion implantation process. In this case, the low-resistance layer can be formed with a good controllability. Meanwhile, the field emission-type electron source, in which the in-plane dispersion of the emitted electrons is smaller, can be achieved with a lower cost.

Moreover, if the low-resistance layer is composed of an impurity-diffused layer formed by diffusing an impurity into the porous semiconductor layer in the above-mentioned method of manufacturing the field emission-type electron source, there may be provided a step for forming the porous semiconductor layer by making the semiconductor layer porous after the semiconductor layer has been formed on the conductive substrate, and another step for diffusing the impurity into the porous semiconductor layer from the surface of the porous semiconductor layer by means of the thermal diffusion process. In this case, the low-resistance layer can be easily provided comparatively, while enlarging the area of the electron-emitting surface. Meanwhile, the field emission-type electron source, in which the in-plane dispersion of the emitted electrons is smaller, can be achieved with a lower cost.

A further method of manufacturing a field emission-type electron source according to the present invention is a process for producing the field emission-type electron source including (i) a conductive substrate, (ii) a semiconductor layer formed on a surface of the conductive substrate, which includes a porous semiconductor layer in which columnar structures and porous structures composed of fine semiconductor crystals of nanometer scale coexist, a surface of each of the structures being covered with an insulating film; and the average thickness of the porous structures being smaller than or equal to 2 μm; and (iii) a conductive thin film formed on the semiconductor layer, wherein (iv) electrons injected into the conductive substrate are emitted from the conductive thin film through the semiconductor layer by applying a voltage between the conductive thin film and the conductive substrate in such a manner that the conductive thin film acts as a positive electrode against the conductive substrate. The manufacturing method is characterized in that it includes the step of forming the porous semiconductor layer in which the surface of each of the porous structures is parallel to the surface of the conductive substrate by performing the anodic oxidation process to the semiconductor layer after the surface of the semiconductor layer has been smoothed. According to the manufacturing method, the surface of the porous semiconductor layer is smoothed. In consequence, the surface potential is approximately uniformed during the anodic oxidation process so that the rate of progressing the anodic oxidation process is also approximately uniformed. In consequence, the depth of the porous structures becomes approximately uniform so that the electrical field is applied approximately uniformly. Therefore, the field emission-type electron source, in which the in-plane dispersion of the emitted electrons is smaller, can be achieved with a lower cost. Meanwhile, the direction of progress of the anodic oxidation becomes approximately perpendicular to the conductive substrate so that the electrical field in the porous structures becomes approximately perpendicular to the conductive substrate. In consequence, the progressing directions of the emitted electrons become uniformly perpendicular to that. Further, because the distribution of the emitting angles of the electrons is very small, a display with high definition may be achieved.

BRIEF DESCRIPTION OF THE DRAWINGS

The present invention will become more fully understood from the detailed description given below and the accompanied drawings.

FIG. 10 is a schematic view showing the conditions of the electrical fields in such cases that the porous semiconductor layer is not provided with a low-resistance layer and it is provided with that.

DETAILED DESCRIPTION OF THE PREFERRED EMBODIMENTS

Figure 1:
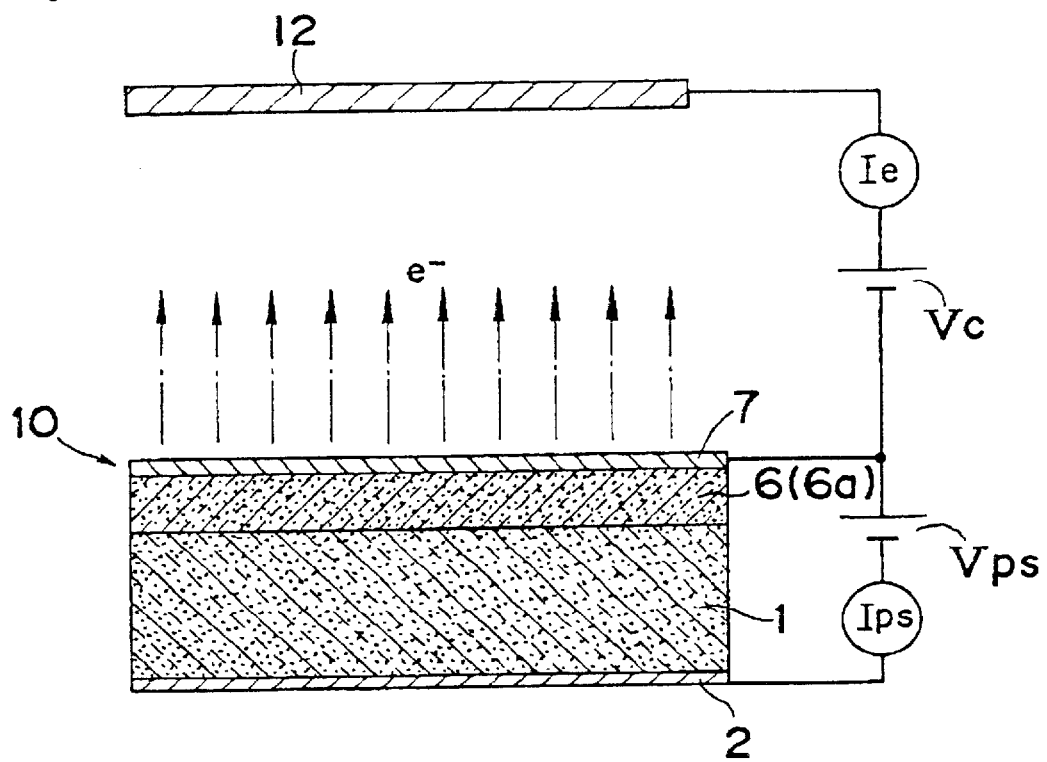
FIG. 1 is a schematic view explaining the principle of the electron-emitting mechanism in a field emission-type electron source according to the present invention.

Hereinafter, preferred embodiments of the present invention will be concretely described.

(Embodiment 1)

In order to achieve the above-mentioned object, the present inventors have eagerly made studies of a field emission-type electron source (hereinafter, merely referred to "electron source"), and then have obtained the knowledge described below.

That is, the electron source, which is described in the Japanese Laid-open Patent Publication No. 8-250766 or the Japanese Laid-Open Patent Publication No. 9-259795, has the semiconductor layer which is provided with the ohmic electrode on one main surface thereof. Further, the porous layer, into which electrons are injected, is formed on the other main surface of the semiconductor layer by making the semiconductor layer porous. Meanwhile, the thin metal film electrode is provided on the surface of the porous layer. However, in the above-mentioned construction, the popping phenomenon of the electrons is easily caused, and further the in-plane dispersion of the amount of the emitted electrons easily occurs.

It may be considered that the reason why the above-mentioned disadvantages easily occur, is as follows. That is, originally, the heat-insulating property of the porous layer is very high. In addition, the heat-insulating property of the porous layer becomes extremely high because the electron source is operated in the vacuum atmosphere. Therefore, it may be considered that when the voltage is applied between the both electrodes so that the current, which takes part in the emission of the electrons, flows, the temperature rise in the porous layer becomes much larger. Moreover, the lattice vibration in the porous layer becomes larger due to the temperature rise. Thus, at a position where the temperature rise is larger, the number of scattering of the electrons, which pass through the porous layer, increases due to the lattice vibration. In consequence, the amount of the emitted electrons is made extremely unstable. There is repeated such a phenomenon that the temperature is elevated due to the current flow at first, the current flow is restrained by the temperature rise so that the temperature is lowered, and then the temperature returns to the initial state. Thus, the amount of the emitted electrons is made unstable with the lapse of time. It is considered that the popping phenomenon of the electrons may easily occur due to the above. Meanwhile, the resistance of the semiconductor is lowered by the temperature rise so that the amount of the electrons, which are injected into the porous layer, increases. It is also considered that the popping phenomenon may easily occur due to the above-mentioned change of the amount of the electrons due to the temperature change.

Meanwhile, because the porous layer has an extremely complicated construction, it is difficult to arrange the pores with a geometrical state. In consequence, the current path may become ununiform in the plane. In particular, when the porous layer is formed by means of the anodic oxidation process, it may be more difficult to obtain a porous structure in which the pores are arranged in the geometrical state because an electrochemical reaction is used. If the current path becomes ununiform in the plane, the current flowing in the porous layer becomes ununiform. In consequence, the heat generated by the current also becomes ununiform in the plane. As described above, the generated heat has a function to restrain the current flow. Therefore, the generated heat further enlarges the in-plane dispersion of the current due to the ununiformity of the current path. Hereupon, because a part of the current contributes to the emission of the electrons, it may be considered that the in-plane dispersion of the amount of the emitted electrons easily occurs.

Meanwhile, in the electron source described in the Japanese Laid-Open Patent Application No. 9-259795, the emission of the electrons occurs at a position which is very near to the surface of the porous semiconductor layer. Therefore, it is preferable that the thickness of the porous semiconductor layer is smaller. However, it is necessary that the thickness is larger to a certain degree in order to obtain the uniformity or stability of the device. Thus, it is shown that the practically usable range of the thickness is 0.1 to 50 $\mu$m. Hereupon, if the thickness of the porous semiconductor layer is decreased in order to raise the electron-emitting efficiency so as to increase the amount of the emitted electrons, it is considered that the heat generated in a portion which highly influences the emission of the electrons at the surface layer, may causes a certain problem, because the amount of the emitted electrons increases. It may be considered that the problem becomes more remarkable as the thickness of the porous semiconductor layer becomes smaller. Therefore, it may cause a practical problem to simply decrease the thickness of the porous layer. That is, in the prior art, it may be considered that it is difficult to increase the amount of the emitted electrons and the electron-emitting efficiency while restraining the popping phenomenon and the in-plane dispersion of the amount of the emitted electrons.

The present inventors have achieved the present invention on the basis of the above-mentioned knowledge.

An electron source according to Embodiment 1 of the present invention includes a conductive substrate, a semiconductor layer formed on a surface of the conductive substrate, at least a part of the layer being made porous, and a conductive thin film (surface electrode) formed on the semiconductor layer, wherein electrons injected into the conductive substrate are emitted from the conductive thin film through the semiconductor layer by applying voltage between the conductive thin film and the conductive substrate in such a manner that the conductive thin film acts as a positive electrode against the conductive substrate. In the electron source, the semiconductor layer includes a porous semiconductor layer in which columnar structures and porous structures composed of fine semiconductor crystals of nanometer scale coexist, the surface of each of the structures being covered with an insulating layer. Hereupon, the average dimension of each of the porous structures in the thickness direction of the semiconductor layer is smaller than or equal to 2 µm.

Hereinafter, an electron source and the electron-emitting mechanism thereof will be concretely described.

As shown in FIG. 1, the electron source 10 is provided with a conductive substrate 1 composed of an n-type silicon substrate. Further, on a main surface of the conductive substrate 1, a porous semiconductor portion 6a of a porous semiconductor layer 6 (strong field drift layer) is formed with a laminated state, the portion being composed of an oxidized porous polycrystalline silicon layer (In the construction shown in FIG. 1, the whole porous semiconductor layer 6 functions as the porous semiconductor portion.). Moreover, on the porous semiconductor layer 6 (porous semiconductor portion 6a), a conductive thin film 7 (surface electrode) composed of a thin metal film is formed with a laminated state. On the back surface of the conductive substrate 1, an ohmic electrode 2 is formed.

When the electrons are emitted from the electron source 10, a collector electrode 12 is disposed so as to face the conductive thin film 7. The space between the conductive thin film 7 and the collector electrode 12 is maintained in a vacuum condition. Then, DC voltage Vps is applied between the conductive thin film 7 and the conductive substrate 1 (ohmic electrode 2) in such a manner that the conductive thin film 7 has a higher electrical potential against the conductive substrate 1. On the other hand, DC voltage Vc is applied between the collector electrode 12 and the conductive thin film 7 in such a manner that the collector electrode 12 has a higher electrical potential against the conductive thin film 7. If each of the DC voltages Vps, Vc is conveniently set, the electrons injected into the conductive substrate 1 drift through the porous semiconductor layer 6, and then emitted from the conductive thin film 7 (The dashed line in FIG. 1 shows flows of the electrons e⁻ emitted from the conductive thin film 7.). The conductive thin film 7 is composed of a material having a smaller work function. The thickness of the conductive thin film 7 is set to about 10 to 15 nm.

Figure 2:
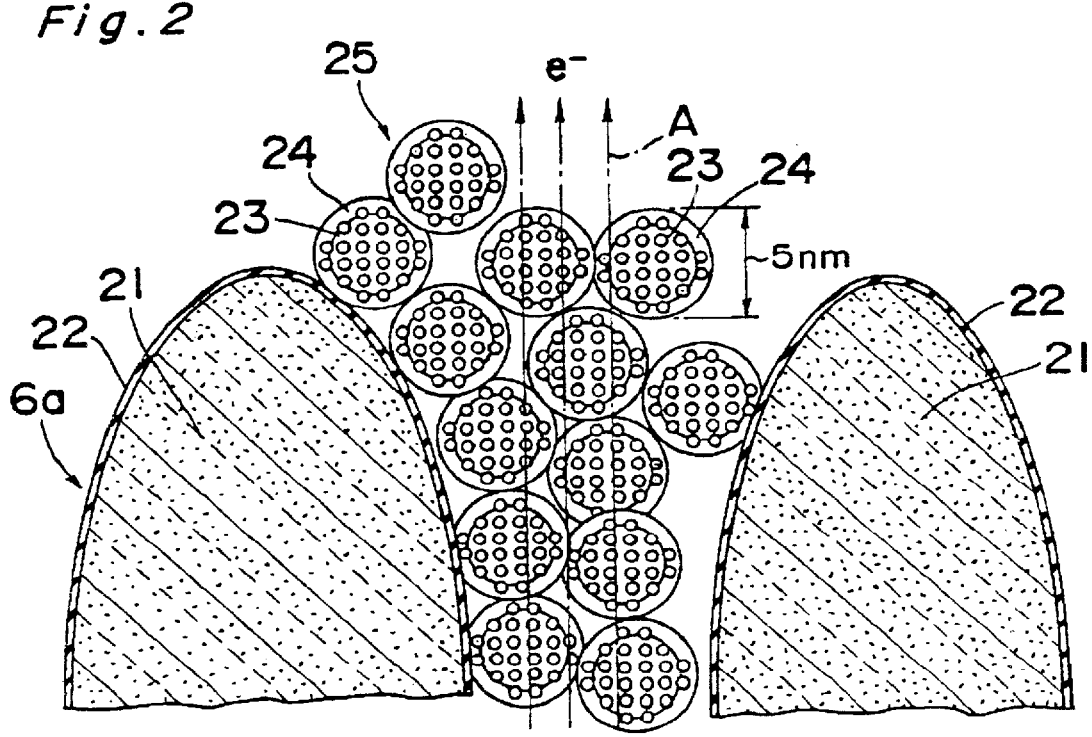
FIG. 2 is a schematic view explaining the electron-emitting action in the field emission-type electron source shown in FIG. 1.

As shown in FIG. 2, the porous semiconductor portion 6a of the porous semiconductor layer 6 includes columnar structures 21 (grains) composed of columnar polycrystalline silicon. On the surface of each of the columnar structures 21, a thin insulating film 22 composed of a silicon oxide film is formed. Meanwhile, the porous semiconductor portion 6a includes fine crystalline silicon particles 23 of nanometer scale disposed among the columnar structures 21. On the surface of each of the fine crystalline silicon particles 23, there is formed an insulating film 24 composed of a silicon oxide film, the thickness of the film being smaller than the crystalline particle diameter of the fine crystalline silicon particles 23. The many fine crystalline silicon particles 23 with the insulating films 24 constitute porous structures 25. It may be considered that the surface portion of each of the grains, which is contained in the polycrystalline silicon before pore-forming process, is made porous so that the crystalline state is maintained by means of the remaining grains, namely columnar structures 21, in the porous semiconductor portion 6a. Therefore, the most part of the electrical field, which is applied to the porous semiconductor portion 6a, is converged and applied to the insulating films 24. In consequence, the injected electrons e⁻ are accelerated among the columnar structures 21 by the strong electrical field applied to the insulating films 24, and then drift in the direction of the arrow A in FIG. 2 (upward in FIG. 2). Hereupon, it may be considered that the electrons, which have reached the surface of the porous semiconductor portion 6a, are hot electrons so that they easily tunnel the conductive thin film 7, and then are emitted into the vacuum atmosphere.

In the electron source 10, the current flowing between the conductive thin film 7 and the ohmic electrode 2 is referred to "diode current Ips". Meanwhile, the current flowing between the collector electrode 12 and the conductive thin film 7 is referred to "emitted electron current Ie" (see FIG. 1). The larger the ratio of the emitted electron current Ie to the diode current Ips (Ie/Ips) becomes, the higher the electron-emitting efficiency becomes. Hereupon, in the electron source 10, even if the DC voltage Vps applied between the conductive thin film 7 and the ohmic electrode 2 is a low voltage such as about 10 to 20V, the electrons can be emitted. Further, in the electron source 10, the electron-emitting property less depends on the degree of the vacuum. In addition, the popping phenomenon does not occur when the electrons are emitted so that the electrons may be stably emitted with a higher electron-emitting efficiency.

In the above-mentioned construction, an n-type silicon substrate is used as the conductive substrate 1. However, instead of the conductive substrate 1 composed of the n-type silicon substrate, there may be also used a conductive substrate in which an ITO film or a conductive film such as a metal film of Al, Ni, Cr, Mo, Ti, W, Pt etc. is formed on an insulating substrate such as a glass plate. In this case, the area of the electron-emitting surface of the electron source 10 can be made larger so that the cost of the electron source 10 may be reduced.

Figure 3:
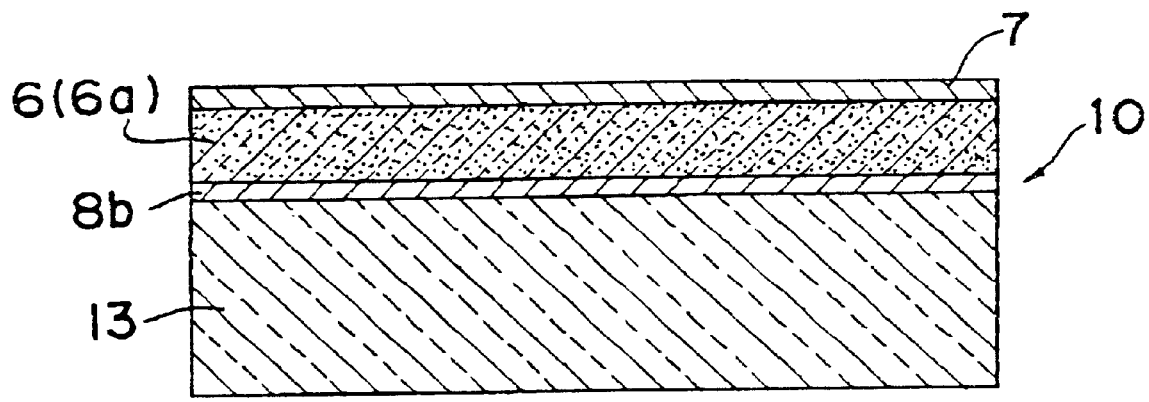
FIG. 3 is a sectional elevation view of a field emission-type electron source according to the present invention, wherein the conductive substrate is a substrate in which a conductive film is formed on a glass plate.

In FIG. 3, there is shown an example of the conductive substrate having the construction described above. The conductive substrate includes an insulating substrate 13 composed of a glass plate and a conductive layer 8b composed of an ITO film, which is formed on the insulating substrate 13. A conductive thin film 7 (surface electrode), which is composed of a thin metal film, is formed with a laminated state above the conductive layer 8b, while interposing a porous semiconductor layer 6 (porous semiconductor portion 6a) between the film 7 and the layer 8b. In the electron source 10, after a non-doped polycrystalline silicon layer has been deposited on the conductive layer 8b, the polycrystalline silicon layer is made porous by means of the anodic oxidation process, and then it is oxidized or nitrified so that the porous semiconductor layer 6 is formed.

Hereupon, the process for making the electron source 10 shown in FIG. 3 emit the electrons, is as same as the case of the electron source 10 shown in FIG. 1, except that the DC voltage Vps is applied between the conductive thin film 7 and the conductive layer 8b in such a manner that the conductive thin film 7 has a higher electrical potential against the conductive layer 8b.

Figure 4:
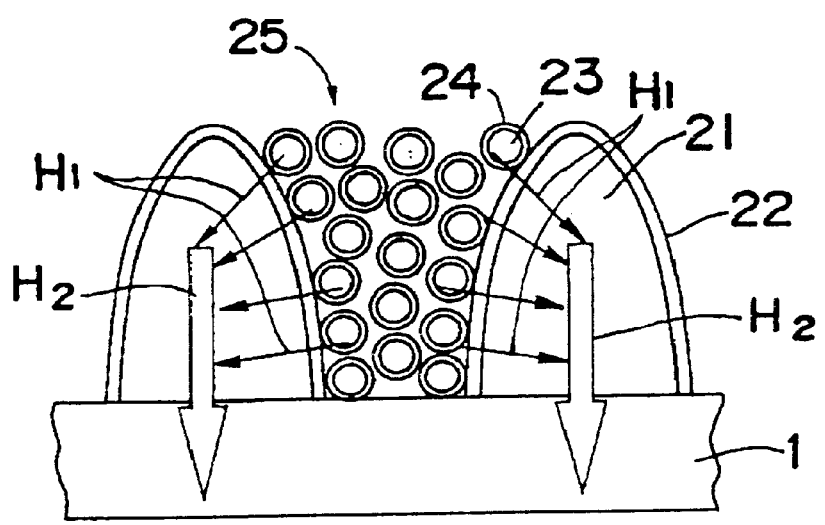
FIG. 4 is a schematic view explaining the condition of the heat transfer in the porous semiconductor layer.

As shown in FIG. 4, in the electron source 10, heat is generated in the porous structures 25, due to collision of the electrons which is caused by the current flowing through the fine crystalline silicon particles 23 (composition of the porous structures) of several nm, the is particles constituting the porous structures 25. The heat is discharged from the porous structures 25 to the columnar structures 21 as shown by the arrow $H_1$, and further discharged to the conductive substrate 1 through the columnar structures 21, which exist near the porous structures 25, as shown by the arrow $H_2$. In consequence, the temperature rise of the porous structures 25 becomes extremely small. If the temperature rise is small, the increase of the lattice vibration of the atoms constituting the porous structures 25 is restrained. Therefore, the number of scattering due to the lattice vibration of the electrons passing through the porous structure 25 does not increase. In consequence, the amount of the emitted electrons is highly stabilized, and further the amount of the emitted electrons increases. As the result, the popping phenomenon, which is a large change of the amount of the emitted electrons with the lapse of time, is diminished, and further the in-plane dispersion of the amount of the emitted electrons due to the generated heat is reduced.

In the conventional electron source, the porous semiconductor layer is composed of the porous structures only, the structure having a very high heat-insulating property. On the other hand, in the above-mentioned construction according to the present invention, the heat generated in the porous structures 25 due to the electron emission is discharged to the conductive substrate 1 through the columnar structures 21. In consequence, the temperature rise of the porous structures 25 becomes extremely small in comparison with the conventional construction.

Meanwhile, if the temperature rise of the porous structures 25 is large, the resistance of the adjacent semiconductor layer is lowered so that the amount of the injected electrons increases. The above-mentioned change of the amount of the injected electrons due to the temperature change may promote such matters that the popping phenomenon easily occurs when the electrons are emitted, and the irregularity of the amount of the emitted electrons easily occurs. However, the temperature rise is extremely small in the above-mentioned construction, the occurrence of the popping phenomenon may be extremely restrained. Further, because the occurrence of the in-plane dispersion of the temperature rise plane is restrained, the irregularity of the amount of the emitted electrons less occurs.

Meanwhile, in order to apply the electron source 10 in various ways, it is essential to increase the amount of the emitted electrons. Therefore, it is necessary to achieve a further increase of the electron-emitting efficiency of the construction and an increase of the amount of the emitted electrons. In order to achieve the above, it is necessary to increase the intensity of the electrical field of the porous structures 25. However, even if the applied voltage is elevated in order to increase the intensity of the electrical field in the construction, it may be nothing but that the intensity of the electrical field around the apex portions of the columnar structures 21 increases. Therefore, the intensity of the electrical field may not be highly improved.

Figure 5:
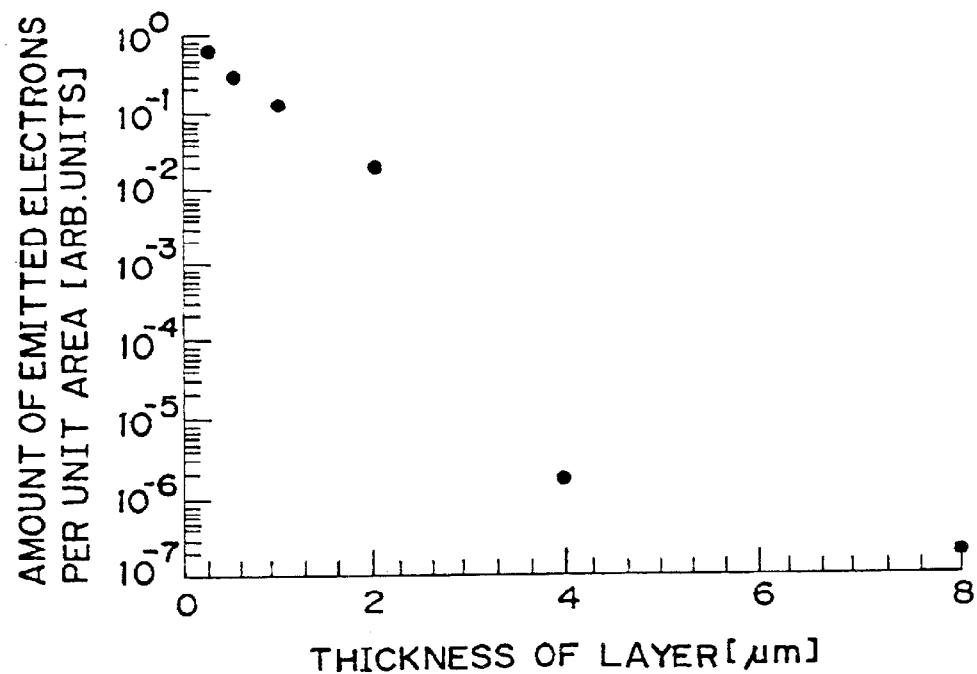
FIG. 5 is a graph showing a relation between the thickness of the porous semiconductor layer and the amount of emitted electrons per unit area.

Thus, based on the result shown in FIG. 5, the present inventors have found that it is desirable that the thickness of each of the porous structures 25 is smaller than or equal to 2 $\mu$m in order to effectively apply the electrical field to the porous structures 25 (uniform the electrical field), while achieving the construction which can raise the heat-discharging property of the porous structures 25 (the width of each of the porous structures 25 is smaller than or equal to 2 $\mu$m in the horizontal section). If the electrical field in the porous structures 25 is uniformed, the porous structures 25 may be effectively utilized for emitting the electrons. As the result, the amount of the emitted electrons and the electron-emitting efficiency are increased so that the in-plane dispersion of the amount of the emitted electrons is restrained (the brightness irregularity is restrained as to a display).

Figure 6:
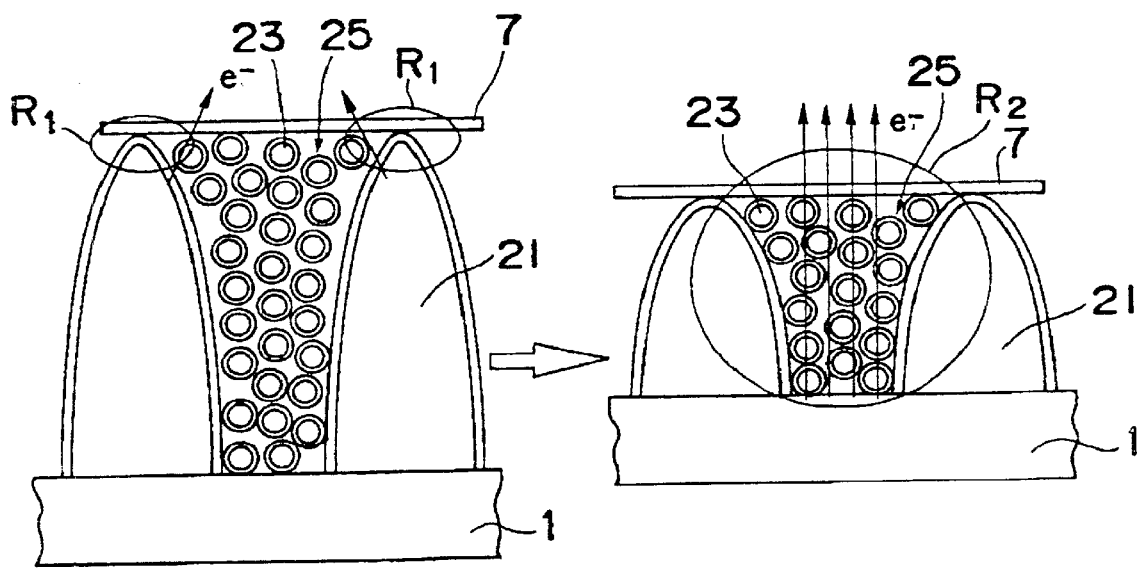
FIG. 6 is a schematic view showing the estimated electron-emitting conditions in such cases that the thickness of the porous semiconductor is larger and it is smaller.

FIG. 6 shows an estimated mechanism. If the thickness of the porous structures 25 is larger (left side in FIG. 6), the electrical field converges at the region $R_1$. On the other hand, if the thickness of the porous structures 25 is smaller (right side in FIG. 6), the electrical field is uniformed in the region $R_2$. That is, if the thickness of each of the porous structures 25 is smaller, the electrical field, which converges at the contact portions between the columnar structures 21 and the conductive thin film 7 in the prior art, is uniformly applied to the porous structures 25, too. In particular, the effect that the heat generated in the porous structures 25 is discharged through the columnar structures 21, is more elevated as the width (in-plane size) of each of the porous structures 25 is smaller, although the effect also depends on materials of the porous structures 25. It is necessary that the thickness of each of the porous structures 25 is smaller than or equal to 2 $\mu$m, in order to uniform the electrical field while effectively elevating the above-mentioned effect.

(Embodiment 2)

Hereinafter, Embodiment 2 of the present invention will be described.

In the electron source 10 according to Embodiment 1, irregularity (convex portions and concave portions) may be formed on the surface layer of the porous semiconductor layer 6, depending on the process condition for forming the layer. If the columnar structures 21 and the porous structures 25 are individually formed by different processes, very large irregularity may be easily formed between the both. If there is used, for example, such a process including the steps of forming columnar structures and fine pores in the semiconductor layer by means of the RIE process or the FIB process, dispersing fine silicon powder or the like on the spin-on-glass or the like to fill the powder into the fine pores, and performing a heat treatment, very large irregularity may be easily formed. Meanwhile, when a polycrystalline silicon film formed by means of the LPCVD process, for example, is used as the porous semiconductor layer, irregularity may be easily formed in the direction that the grains grows if the thickness of the polycrystalline silicon film is larger. Further, when the semiconductor layer is made porous by means of the anodic oxidation process, many fine convex portions and concave portions are formed on the surface. As the result, many fine convex portions and concave portions (irregularity) are formed on the surface of the porous semiconductor layer.

Between the porous semiconductor layer 6 and the conductive thin film 7 formed thereon, there exist portions in which the both contact to one another and portions in which the both do not contact to one another, if irregularity is formed on the surface of the porous semiconductor layer 6. In consequence, when the electrical field is applied between the conductive thin film 7 and the conductive substrate 1, the electrical field is ununiformly applied into portions in the porous semiconductor layer 6, depending on whether the conductive thin film 7 and the porous semiconductor layer 6 contact or not to one another at the portions. As the result, the amount of the emitted electrons becomes ununiform in the plane. Therefore, if the electron source 10 is applied to a display, there may occur such a disadvantage that the brightness dispersion in the plane of the screen becomes larger. Meanwhile, in the electron source 10, the electron field applied to the porous semiconductor layer 6 converges at the apexes of the convex portions or the bottoms of the concave portions on the surface of the porous semiconductor layer 6. Thus, the amount of the emitted electrons increases at the portions where the electrical field converges. In consequence, if the electron source 10 is applied to a display or the like, there may occur such a disadvantage that the luminous brightness of specific points becomes brighter so that the in-plane bright dispersion of the screen becomes larger.

Hereupon, in the Japanese Laid-Open Patent Publication No. 10-269932, there is disclosed an electron-emitting device in which a low-porosity layer with a high resistance is provided on a surface portion of a porous silicon layer to which the electrical field is applied. In the electron-emitting device, the contacting property between the porous silicon layer and the conductive thin film can be improved by providing the low-porosity layer with a high resistance. Further, the diode current flowing through the electron-emitting device can be made small so that the electron-emitting efficiency may be improved. However, because the low-porosity layer provided on the surface of the porous silicon layer, to which the electrical field is applied, has a higher resistance in the electron-emitting device, the electrical field applied to the porous silicon layer may easily converge at the apexes of the convex portions or the bottoms of the concave portions on the surface of the low-porosity layer. In consequence, it may be considered that the amount of the emitted electrons increases at the portions where the electrical field converges. Therefore, if it is applied to a display or the like, it may be feared that the luminous brightness of specific points becomes brighter so that the in-plane brightness dispersion of the screen becomes larger.

Thus, in order to solve the above-mentioned disadvantages, in the present Embodiment 2, the porous semiconductor layer is formed by making the polycrystalline silicon layer porous, in which the semiconductor layer to be made porous is uniformly formed on the conductive substrate. According to the construction, the polycrystalline silicon layer itself does not have large irregularity (convex portions and concave portions). Meanwhile, if it is made porous by means of the anodic oxidation process, the height of the porous structures and the height of the columnar structures are identical to one another. Therefore, portions, in which the conductive thin film and the porous semiconductor layer do not contact to each other, may be less formed over the wide region so that the above-mentioned disadvantages are partially solved.

Figure 7:
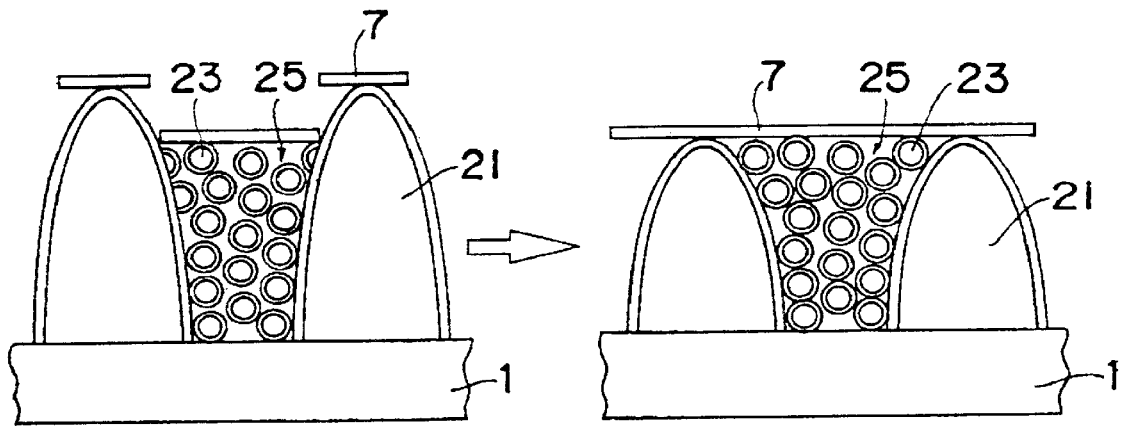
FIG. 7 is a schematic view showing the conditions of the conductive thin films in such cases that the height of the columnar structure and the height of the porous structure are different from each other and they are identical.

As shown in FIG. 7, if the height of each of the porous structures 25 and the height of each the columnar structures 21 are different from each other (left side in FIG. 7), it may be feared that the conductive thin film 7 is electrically snapped. On the other hand, if the height of each of the porous structures 25 and the height of each of the columnar structures 21 are identical to each other (right side in FIG. 7), it may not be feared that the conductive thin film 7 is electrically snapped. That is, if the height of each of the columnar structures 21 and the height of each of the porous structures 25 are different from each other, irregularity may be formed on the surface of the porous semiconductor layer. In this case, the conductive thin film 7 with a very small thickness formed on the porous semiconductor layer cannot cover with the irregularity completely. In consequence, the conductive thin film 7 falls into a state that it is electrically snapped so that it cannot function as the electrode. On the contrary, if the height of each of the columnar structures 21 and the height of each of the porous structures 25 are identical to each other, the above-mentioned problems are solved so that the conductive thin film 7 (surface electrode) may be formed in an electrically communicated state.

If the conductive thin film 7 is electrically communicated, the necessary electrical field is effectively applied to the porous structures 25. In consequence, the properties of the electron source 10 may be sufficiently pulled out.

Further, if the porous semiconductor layer 6 is composed of a polycrystalline silicon layer formed by means of the anodic oxidation process, the columnar structures 21 and the porous structures 25 can be formed by a single step by performing the anodic oxidation process to the polycrystalline silicon layer. In consequence, the manufacturing process of the electron source 10 may be simplified. Further, the formation or anodic oxidation of the polycrystalline silicon layer is advantageous for enlarging the area of the electron-emitting surface. Particularly, if there exist grains which have grown to the columnar shapes, the pore formations progress along the grains. In consequence, the angles of the porous structures 25 in their depth direction become approximately perpendicular to the conductive substrate so that the electrical field in the porous structures 25 becomes approximately perpendicular to the conductive substrate 1. Because the emission of the electrons is dominated by the electrical field in the porous structures 25 in this case, the electrons are emitted in the direction perpendicular to the conductive substrate 1. In consequence, the distribution of the emitting-angles of the electrons is decreased. Thus, higher definition can be achieved when the electron source 10 is applied to a display or the like.

Figure 8A:
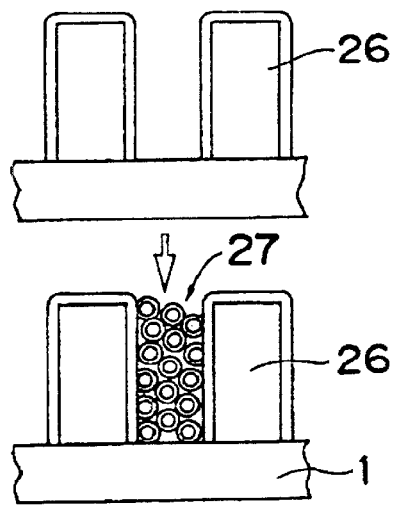
FIG. 8A is a schematic view showing the construction of a porous semiconductor layer which does not use polycrystalline silicon.

FIG. 8A shows an example of a process for forming a construction, in which columnar structures and porous structures coexist, without using the polycrystalline silicon substrate. In this case, the columnar structures 26 are formed by means of the etching treatment using the RIE process or the FIB process. Then, fine powder with a nanometer structure is buried into the concave portions among the columnar structures 26 so that the porous structures 27 are formed. Alternatively, vertical holes are formed by performing the anodic oxidation process to an Al plate or the like, and then fine powder with a nanometer structure is buried into the vertical holes (concave portion). However, in this case, it is necessary to individually form the columnar structures 26 and the porous structures 27 using different manufacturing processes. Further, it is difficult to enlarge the area of the electron-emitting surface.

Figure 8B:
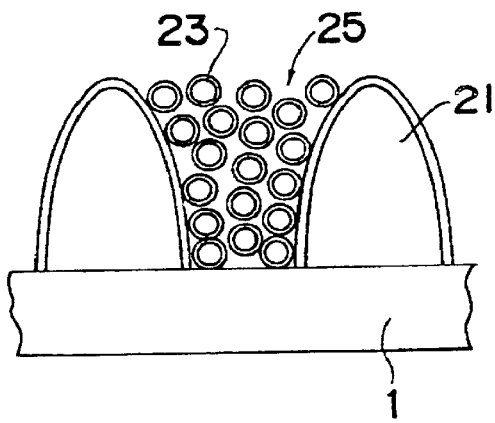
FIG. 8B is a schematic view showing the construction of a porous semiconductor layer using polycrystalline silicon.

On the other hand, as shown in FIG. 8B, if the process, which performs the anodic oxidation to the polycrystalline silicon layer, is used, the polycrystalline silicon layer is made porous along the grains which have grown to columnar shapes. In consequence, the above-mentioned construction is easily formed with a single step. Meanwhile, if the film formation using polycrystalline silicon or the pore formation by means of the anodic oxidation is used, the area of the electron-emitting surface may be easily enlarged.

(Embodiment 3)

Hereinafter, Embodiment 3 of the present invention will be described.

An electron source according to Embodiment 3 is characterized in that a low-resistance layer of predetermined thickness is provided on the thin film side end portion of the porous semiconductor layer in the thickness direction of the semiconductor layer, the low-resistance layer having a lower resistance in comparison with other parts of the porous semiconductor layer. Hereinafter, the electron source and the electron-emitting mechanism thereof will be described.

Figure 9:
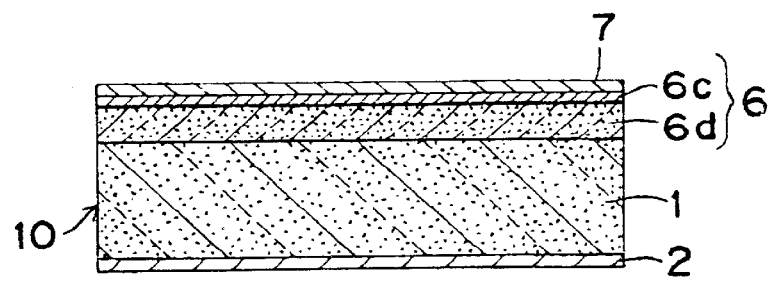
FIG. 9 is a sectional elevation view of another field emission-type electron source according to the present invention, in which the conductive substrate is composed of an n-type silicon substrate.

As shown in FIG. 9, in the electron source 10, a low-resistance layer 6c of predetermined thickness, which has a lower resistance in comparison with the other parts, is provided on the thin film side surface portion of the porous semiconductor layer 6 in the thickness direction thereof. The low-resistance layer 6c acts as a mimic electrode so that the in-plane electrical potential in the surface portion of the porous semiconductor layer 6 becomes identical. In consequence, even if the porous semiconductor layer 6 does not partially contact to the conductive thin film 7, the electrical field is uniformly applied into the porous semiconductor layer 6 at the same plane. Therefore, the dispersion of the amount of the emitted electrons at the plane may be restrained. Thus, if the electron source 10 is applied to a display, the brightness dispersion on the screen may become smaller.

Figure 10:
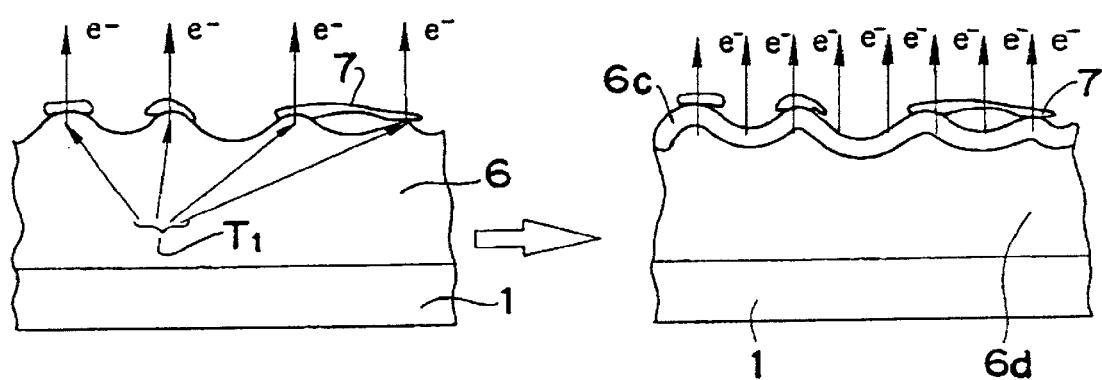

As shown in FIG. 10, if the low-resistance layer 6c is not provided (left side in FIG. 10), the electrical field converges at the portions shown by $T_1$. On the other hand, if the low-resistance layer 6c is provided (right side in FIG. 10), the electrical field is uniformed. That is, if irregularity exists on the surface of the porous semiconductor layer 6, the conductive thin film 7, which is formed in a very thin shape to increase the amount of the emitted electrons, tends to become a net-like shape In consequence, the electrical field converges at the portions where the conductive thin film 7 of net-like shape contacts to the porous semiconductor layer 6. Thus, the amount of the emitted electrons extremely increases at the portions so that ununiformity of the amount of the emitted electrons occurs (brightness dispersion as to a display). On the other hand, if the low-resistance layer 6c is provided on the surface layer of the porous semiconductor layer 6, the low-resistance layer 6c acts as a mimic surface electrode so that its electrical potential becomes identical. In consequence, the intensity of the electrical field in the porous semiconductor layer 6 is uniformed. As the result, the in-plane dispersion of the amount of the emitted electrons of the manufactured electron source 10 becomes extremely small.

Preferable examples of the above-mentioned low-resistance layer 6c are as follows.

It is preferable that the thickness of the low-resistance layer 6c is smaller than the mean free path of the electrons in the semiconductor forming the low-resistance layer 6c. If the thickness of the low-resistance layer 6c is set to a value smaller than the mean free path of the electrons moving in the layer, the energy loss of the electrons due to scattering of the electrons in the low-resistance layer 6c may be reduced. In consequence, the amount of the electrons which tunnel the low-resistance layer 6c and then are emitted into the vacuum atmosphere, may be highly increased.

Meanwhile, the low-resistance layer 6c may be composed of a low-porosity layer having a smaller porosity in comparison with the other parts of the porous semiconductor layer 6.

Figure 11:
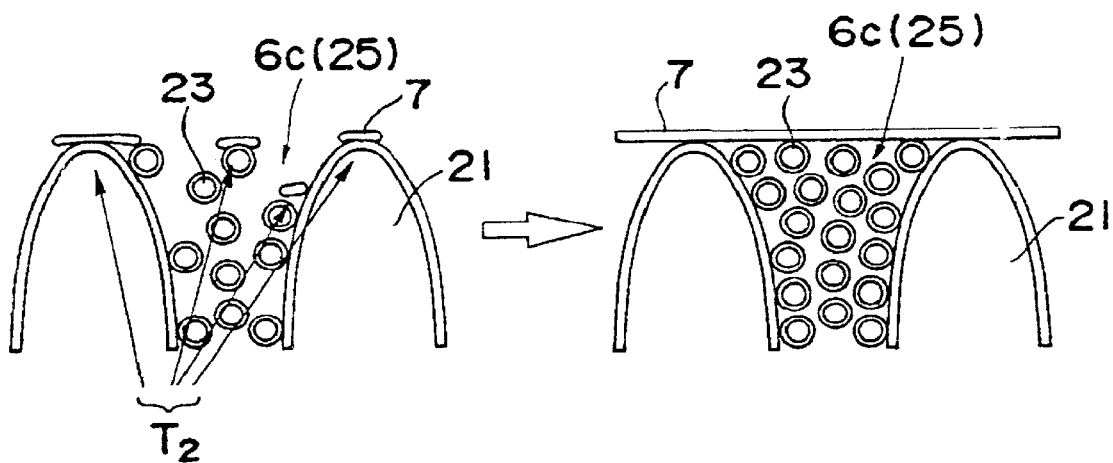
FIG. 11 is a schematic view showing the conditions of the conductive thin films in such cases that the porosity of the low-resistance layer is larger and it is smaller.

As shown in FIG. 11, if the porosity of the low-resistance layer 6c is larger (left side in FIG. 11), the electrical field converges at the portions shown by $T_2$. On the other hand, if the porosity of the low-resistance layer 6c is smaller (right side in FIG. 11), the electrical field is uniformed. That is, if the low-resistance layer 6c is composed of the low-porosity layer, irregularity on the surface of the layer becomes vary smaller so that the coverage of the conductive thin layer 7 may be elevated. In consequence, the electrical field does not converge at the convex portions or concave portions of the porous semiconductor layer 6. As the result, the electrical field is uniformed so that the dispersion of the amount of the emitted electrons may be restrained.

The above-mentioned low-resistance layer 6c composed of the low-porosity layer may be formed, for example, by a process including the steps of forming the porous semiconductor layer 6 by decreasing the porosity of the surface portion of the semiconductor layer in comparison with the porosity of the other parts of the semiconductor layer after the semiconductor layer has been formed on the conductive substrate 1, and oxidizing or nitrifying the porous semiconductor layer 6. In this case, it is not necessary to provide an individual step for forming the low-resistance layer 6c. In consequence, the electron source 10, in which the in-plane dispersion of the amount of the emitted electrons is smaller, can be achieved with a low cost.

Hereupon, if the semiconductor layer is made porous by means of the anodic oxidation process, the current density may be set to a smaller value during a predetermined initial period of the anodic oxidation process, and then the current density may be increased after the predetermined initial period. During the anodic oxidation process, there exist an interrelation between the current density and the porosity. Meanwhile, the resistance of the low-resistance layer 6c changes in accordance wich the degree of the porosity. Therefore, the resistance of the low-resistance layer 6c can be controlled by controlling the current density.

Meanwhile, when the semiconductor layer is made porous by means of the anodic oxidation process, the light power applied to the surface of the semiconductor layer may be made smaller during a predetermined initial period of the anodic oxidation process, and then the light power may be increased after the predetermined initial period. In this case, the resistance of the low-resistance layer 6c can be controlled by controlling the light power applied to the surface of the semiconductor layer to change the porosity.

Further preferable examples of the above-mentioned low-resistance layer 6c are as follows.

The low-resistance layer 6c may be composed of a re-crystallized layer which is formed by re-crystallizing a surface portion of the porous semiconductor layer 6.

Figure 12:
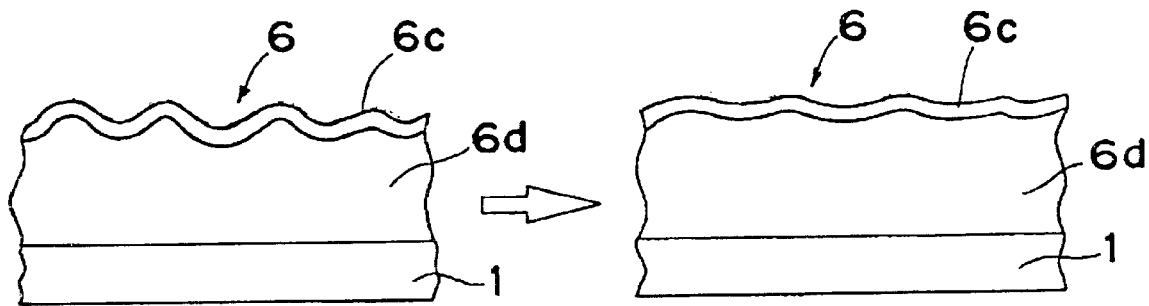
FIG. 12 is a schematic view showing the conditions of the surfaces of the low-resistance layers in such cases treat the low-resistance layer is not re-crystallized and it is re-crystallized.

As shown in FIG. 12, in a regular porous semiconductor layer 6 using polycrystalline silicon (left side in FIG. 12), irregularity exists on the surface of the porous semiconductor layer 6. On the other hand, if the low-resistance layer 6c is composed of a re-crystallized layer (right side in FIG. 12), the irregularity on the surface becomes very small so that the coverage of the conductive thin film 7 is raised. In consequence, the electrical field does not converge at the convex portions or concave portions of the porous semiconductor layer 6. As the result, the electrical field in the porous semiconductor layer 6 is uniformed so that the dispersion of the amount of the emitted electrons may be restrained.

The above-mentioned low-resistance layer 6c composed of the re-crystallized layer may be formed, for example, by a process including the steps of forming the porous semiconductor layer 6 by making the semiconductor layer porous after the semiconductor layer has been formed on the conductive substrate 1, re-crystallizing the surface portion of the porous semiconductor layer 6 by means of the laser anneal process, and oxidizing or nitrifying the porous semiconductor layer 6. In this case, because the portion re-crystallized by the laser anneal process becomes the low-resistance layer 6c, the low-resistance layer 6c can be easily provided, comparatively. In consequence, the field emission-type electron source, in which the in-plane dispersion of the emitted electrons is smaller, can be achieved with a lower cost.

The low-resistance layer 6c may be composed of an impurity-implanted layer which is formed by implanting impurity ions into the porous semiconductor layer through the surface of the porous semiconductor layer. In this cause, it may be easy to control the concentration or distribution of the impurity in the low-resistance layer.

The above-mentioned low-resistance layer 6c composed of the impurity-implanted layer may be formed, for example, by a process including the steps of forming the porous semiconductor layer 6 by making the semiconductor layer porous after the semiconductor layer has been formed on the conductive substrate 1, implanting the impurity ions into the porous semiconductor layer from the surface side of the porous semiconductor layer 6 by means of the ion implantation process, and oxidizing or nitrifying the porous semiconductor layer 6. In this case, the low-resistance layer 6c can be formed with a good controllability so that the electron source 10, in which the in-plane dispersion of the emitted electrons is smaller, can be achieved with a lower cost.

The low-resistance layer 6c may be composed of an impurity-diffused layer which is formed by diffusing an impurity into the porous semiconductor layer through the surface of the porous semiconductor layer. When the low-resistance layer 6c (impurity-diffused layer) is formed by diffusing the impurity, it may be easy to enlarge the area of the electron-emitting surface in comparison with the case that the low-resistance layer 6c (impurity-implanted layer) is formed by implanting the impurity ions.

The above-mentioned low-resistance layer 6c composed of the impurity-diffused layer may be formed, for example, by a process including the steps of forming the porous semiconductor layer 6 by making the semiconductor layer porous after the semiconductor layer has been formed on the conductive substrate 1, diffusing the impurity into the porous semiconductor layer from the surface of the porous semiconductor layer by means of the thermal diffusion process, and oxidizing or nitrifying the porous semiconductor layer 6. In this case, the low-resistance layer 6c, which has a larger area of the electron emitting surface, can be easily provided comparatively. In consequence, the electron source 10, in which the in-plane dispersion of the emitted electrons is smaller, can be achieved with a lower cost.

(Embodiment 4)

Hereinafter, Embodiment 4 of the present invention will be described.

An electron source according to Embodiment 4 is characterized in that the thin film side surface of each of the porous structures 25 is parallel to the surface of the conductive substrate 1. Hereinafter, the electron source 10 and the electron-emitting mechanism thereof will be described.

Figure 13:
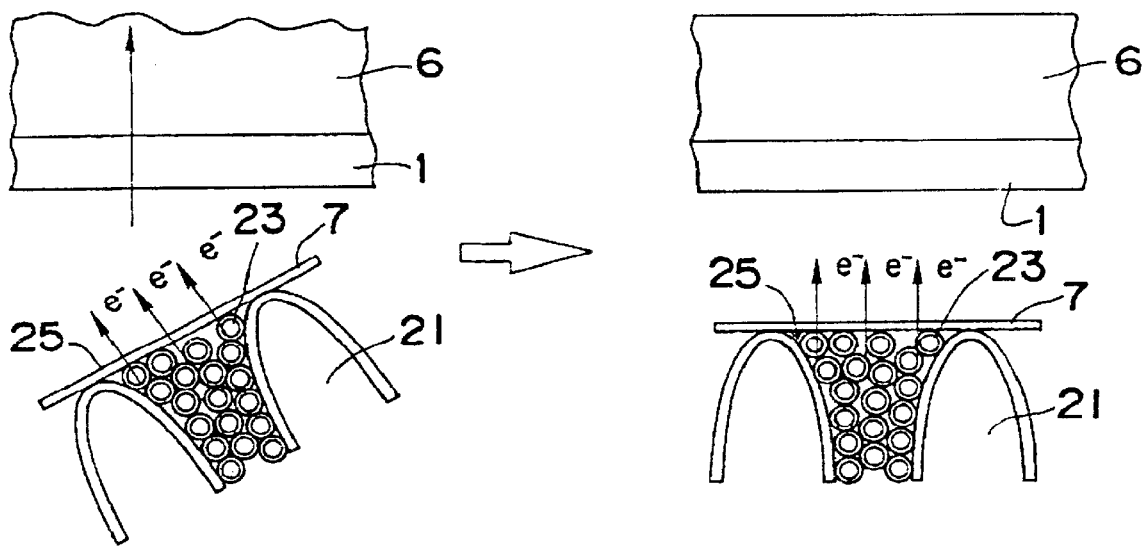
FIG. 13 is a schematic view showing the conditions of the electrical fields in such cases that the surface of the porous semiconductor layer is inclined to the surface of the conductive substrate and they are parallel to each other.

As shown in FIG. 13, if the surface of each of the is porous structures 25 is not parallel to the surface of the conductive substrate 1 (left side in FIG. 13), the electrical field is bent. On the other hand, if the surface of each of the porous structures 25 is parallel to the surface of the conductive substrate 1 (right side in FIG. 13), the electrical field in the porous semiconductor layer is applied to the conductive substrate 1 in the direction perpendicular to the substrate. In consequence, the electrons, which are emitted in the direction perpendicular to the surface of each of the porous structures 25, are also emitted in the direction perpendicular to the surface of the conductive substrate 1. Therefore, the in-plane distribution of the emitting-angles of the electrons is further decreased so that the directions of the emitted electrons uniformly become perpendicular to that. As the result, a screen with higher definition can be achieved in a display for which the electron source 10 is used.

The above-mentioned porous semiconductor layer 6 in which the surface of each of the porous structures is parallel to the surface of the conductive substrate may be formed, for example, by a process including the step of performing the anodic oxidation process to the semiconductor layer after the surface of the semiconductor layer has been smoothed. If the surface of the semiconductor layer, which is to be made porous, is subjected to the anodic oxidation after being smoothed, the surface potential during the anodic oxidation process is uniformed because the surface has been smoothed. In consequence, the progressing rate of the anodic oxidation process is uniformed.

(Embodiment 5)

Hereinafter, Embodiment 5 of the present invention will be described.

Figure 14:
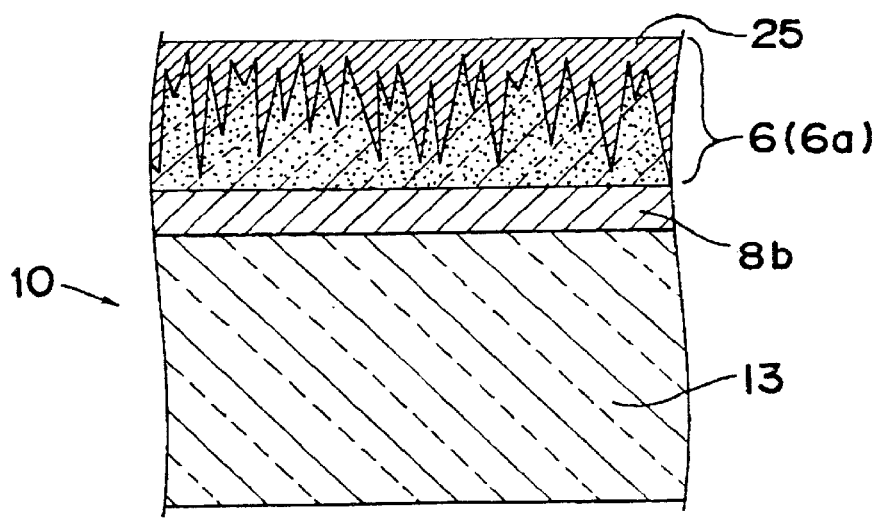
FIG. 14 is a sectional elevation view of a field emission-type electron source, in which the dispersion of the thickness of each of the porous structures is larger.

When the electron source 10 according to Embodiment 1 is manufactured, for example, using the process according to Embodiment 2, namely the process including the steps of making the polycrystalline silicon porous by means of the anodic oxidation process, and oxidizing or nitrifying it to form the porous semiconductor layer, it is probable that the thickness of the porous semiconductor structures 25 (region made porous) in the porous semiconductor layer 6 highly disperse (becomes ununiform) in the plane, as shown in FIG. 14.

The reason may be considered as follows. That is, in the present anodic oxidation process, a constant current is continuously fed between the conductive substrate and the counter electrode in such a manner that the conductive layer of the conductive substrate is used as the positive electrode, while immersing the counter electrode and the object to be treated, in which the polycrystalline silicon layer is formed on the conductive substrate, in the electrolyte. In the polycrystalline silicon, the holes, which contribute the anodic oxidation, do not move unforly due to the grain boundary and so on. Therefore, it may be considered that the portions, through which the holes can easily flow, are selectively oxidized by the anodic oxidation if the current is continuously fed. That is, the rate of the pore formation of the polycrystalline silicon disperses. Meanwhile, in the portions, which have been earlier made porous, the thickness of the polycrystalline silicon layer becomes thinner so that the electrical field converges the portion and the holes also converge there. Therefore, it may be considered that the pore formation around the portions, at which the electrical field converges, is chiefly facilitated if the constant current is continuously fed.

As described above (see Embodiment 1), in the porous semiconductor layer 6, the electrical field becomes strong at the insulating films 24 (silicon oxide films) formed on the surfaces of the fine crystalline silicon particles 23 which exist in the porous structures 25 (regions made porous). Therefore, if the thickness of the porous structures 25 is ununiform, the intensity of the electrical field disperses at every region in the porous semiconductor layer 6. That is, the electrons can not be emitted uniformly from the whole surface of the conductive thin film 7 (surface electrode), while the energy of the electrons emitted from the conductive thin film 7 disperses depending the position. As the result, if the electron source 10 is applied to a display, there may occur such a disadvantage that the brightness dispersion in the plane of the screen becomes larger. Meanwhile, if the thickness has the distribution shown in FIG. 14, in the porous semiconductor layer 6, there may increase such portions at which the intensity of the electrical field is smaller. In the above-mentioned portions, it may be probable that the electrons are not emitted in an extreme case so that the whole electron-emitting efficiency of the electron source 10 can not be sufficiently raised. If the electron-emitting efficiency is lower in the electron source 10 for a display, it is difficult to raise the brightness. In consequence, there may occur such a disadvantage that the screen becomes darker.

Figure 15:
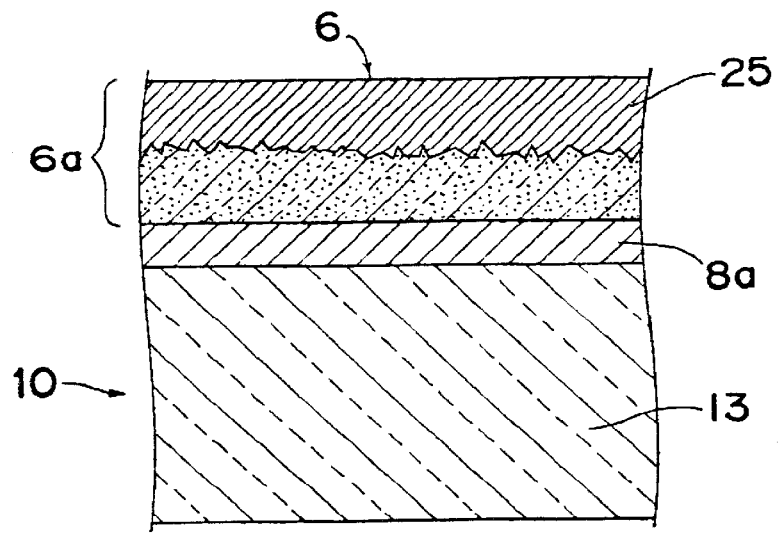
FIG. 15 is a sectional elevation view of a field emission-type electron source, in which the dispersion of the thickness of each of the porous structures is smaller.

Thus, as shown in FIG. 15, in the electron source 10 according Embodiment 5, the difference between the maximum dimension and minimum dimension of the porous structures 25 in the thickness direction of the semiconductor layer is made smaller than or equal to 0.5 μm. Hereinafter, the electron source 10 may be described.

Figure 16:
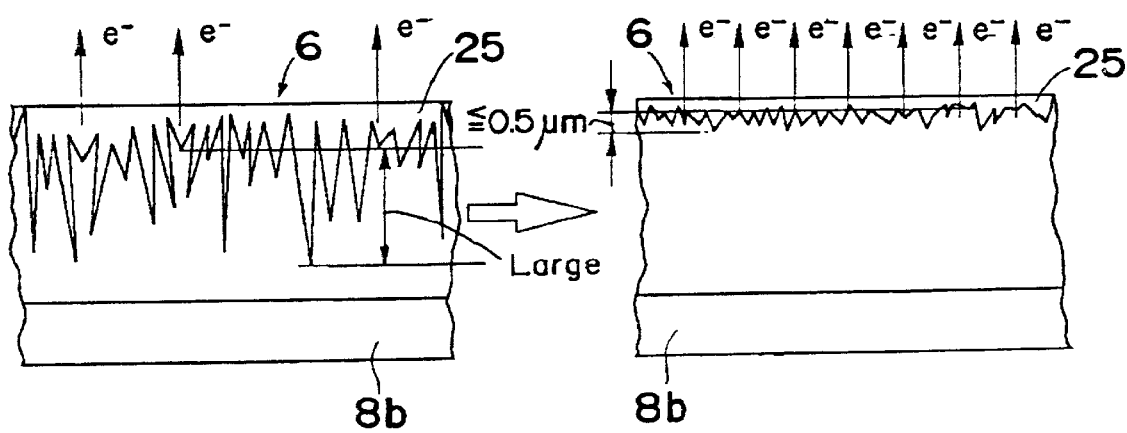
FIG. 16 is a schematic view showing the conditions of the emitted electrons in such cases that the dispersion of the thickness of each of the porous structures is larger and it is smaller.

As shown in FIG. 16, if the dispersion of the thickness of the porous structures 25 is larger (left side in FIG. 16), the electron field is ununiformly applied to the porous structures 25. However, if the dispersion is smaller (right side in FIG. 16), the electron field is uniformed. Namely, if the thickness of each of the porous structures 25 changes, the electrical field applied to the porous structure 25 changes. The electrical field applied to the porous structures 25 highly influences the emission of the electrons from the porous structures 25. Therefore, if the dispersion of the thickness of the porous structures 25 is larger, the amount of the emitted electrons in the plane disperses. It is required that the above-mentioned difference is smaller than or equal to 0.5 μm in order to restrain the dispersion of the thickness of the porous structures 25 so as to restrain the in-plane dispersion of the amount of the emitted electrons, while satisfying the condition of Embodiment 1.

If the dispersion of the thickness of the porous structures 25 is smaller, the electrical field applied to the porous structures 25 is uniformed so that the in-plane dispersion of the amount of the emitted electrons can be restrained. Further, the electrons can be emitted from the whole surface of the porous structures 25 so that the electron-emitting efficiency is raised in comparison with the conventional structures. If the columnar structures 21 and the porous structures 25 are formed by making the semiconductor layer porous using the anodic oxidation process for the polycrystalline silicon according to Embodiment 2 while satisfying the condition of Embodiment 1 (namely, relation between the columnar structures 21 and the porous structures 25 for preventing the popping phenomenon, the thickness of the porous structures 25 is smaller than or equal to 2 μm), the size of each of the columnar structures 21 and the porous structures 25 is influenced by the grain size of the polycrystalline silicon. The size is suitable for discharging the heat, which has been generated in the porous structures, through the columnar structures. Based on the condition described above, the present inventors have eagerly made studies of the electron source, and have found that if the dispersion of the thickness of the porous structures 25 is smaller than or equal to 0.5 μm, the amount of the emitted electrons is comparatively uniformed in the plane, as to the field emission-type electron source in which the popping phenomenon of the electrons is restrained and the amount of the emitted electrons is increased. The reason may be considered that an extreme dispersion of the intensity of the electrical field is not caused in the porous structures 25.

Hereupon, it is preferable that the thickness of the porous structures 25 is approximately equal to the thickness of the semiconductor layer disposed between the conductive thin film 7 and the conductive substrate.

Figure 17:
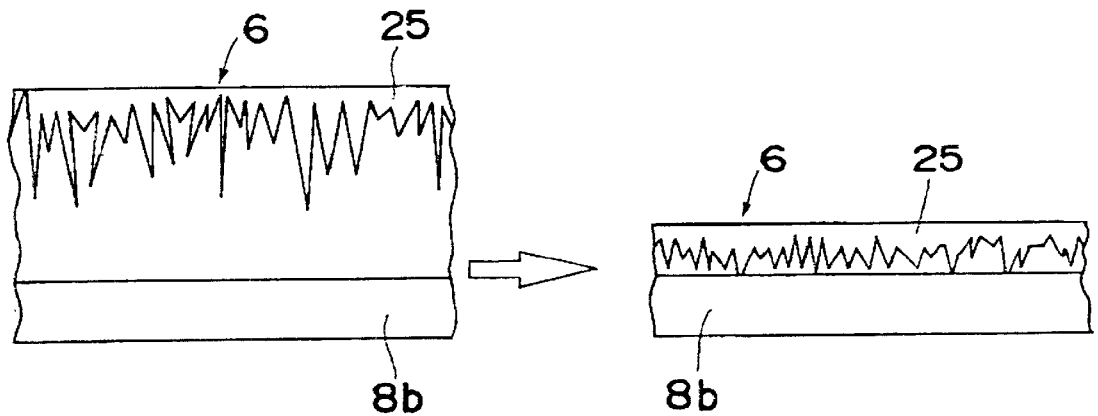
FIG. 17 is a schematic view showing the conditions of the porous semiconductor layers in such cases that the thickness of the porous semiconductor layer is smaller than the interval between the conductive thin film and the conductive substrate, and they are approximately identical to each other.

As shown in FIG. 17, if the thickness of the porous structures 25 is smaller than the interval between the conductive layer 8b (conductive substrate) and the conductive thin film 7 (left side in FIG. 17), the semiconductor layer, which has not been made porous, exists under the porous structures 25. On the other hand, if the thickness of the porous structures 25 is approximately equal to the interval between the conductive layer 8b (conductive substrate) and the conductive thin film 7 (right side in FIG. 17), the semiconductor layer, which has not been made porous, hardly exists under the porous structures 25.

If there exists a portion, which has not been made porous, between the porous structures 25 and the conductive substrate (conductive layer 8b) which acts as the lower electrode when the voltage is applied, a voltage loss occurs at the portion. In consequence, the voltage applied to the porous structures 25 is reduced so that the intensity of the electrical field becomes smaller. On the other hand, if the thickness of the porous structures 25 is approximately equal to the thickness of the semiconductor layer between the conductive substrate and the conductive thin film 7, the voltage, which applied between the conductive substrate and the conductive thin film 7, is wholly applied to the porous structures 25. In consequence, the intensity of the electrical field becomes larger so that the amount of the emitted electrons becomes larger for the same voltage.

Hereupon, it is preferable that an anticorrosive conductive layer, which has an anticorrosion against the electrolyte for the anodic oxidation process used for making the semiconductor layer porous, is provided on the surface of the conductive layer 8b (conductive substrate) at the semiconductor layer side.

Figure 18:
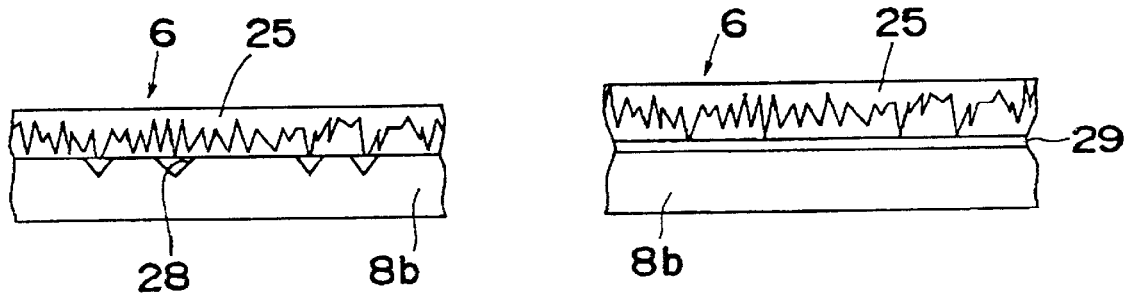
FIG. 18 is a schematic view showing the conditions of the etching processes in such cases that an anticorrosive conductive layer is not provided on the conductive substrate and it is provided.

As shown in FIG. 18, if the anticorrosive conductive layer is not provided (left side in FIG. 18), the conductive layer 8b or the conductive substrate (substrate itself or lower electrode) is corroded by the electrolyte during the anodic oxidation process. In consequence, it may be feared that etched portions 28 are formed in the conductive layer 8b. The above-mentioned corrosion decreases the amount of the emitted electrons, and further may lead to a deterioration of the device due to a snap of the electrode. On the other hand, if the anticorrosive conductive layer 29 is provided (right side in FIG. 18), the corrosion of the electrode or the substrate is prevented so that the etched portion may not formed in the conductive layer 8b. Therefore, there may be achieved such a construction that the thickness of the porous structures 25 is approximately equal to the thickness of the semiconductor layer between the conductive thin film 7 and the conductive substrate, while preventing the decrease of the amount of the emitted electrons and reducing the deterioration of the device.

According to the above-mentioned construction, for example, if the polycrystalline silicon is made porous by means of the anodic oxidation process with longer anodic oxidation time so that the pore formation is originally to be performed over the thickness of the polycrystalline silicon layer, the pore formation is stopped by the surface of the anticorrosive conductive layer 29 at the position where the pore formation has rapidly progressed. In consequence, the pore formation is facilitated at a position where the pore formation has slowly progressed, so that the dispersion of the thickness of the porous structures 25 becomes very small. Due to the above-mentioned construction, the electron field applied to the porous structures 25 is uniformed so that the in-plane dispersion of the amount of the emitted electrons is restrained. Moreover, the conductive layer 8b or the conductive substrate (substrate itself or lower electrode) is not corroded by the electrolyte. Therefore the electrical field may be effectively applied to the porous structures 25. In consequence, the amount of the emitted electrons is not decreased. Further, the deterioration of the device due to snap of the lower electrode may be prevented.

(Embodiment 6)

Hereinafter, Embodiment 6 of the present invention will be described.

Figure 19:
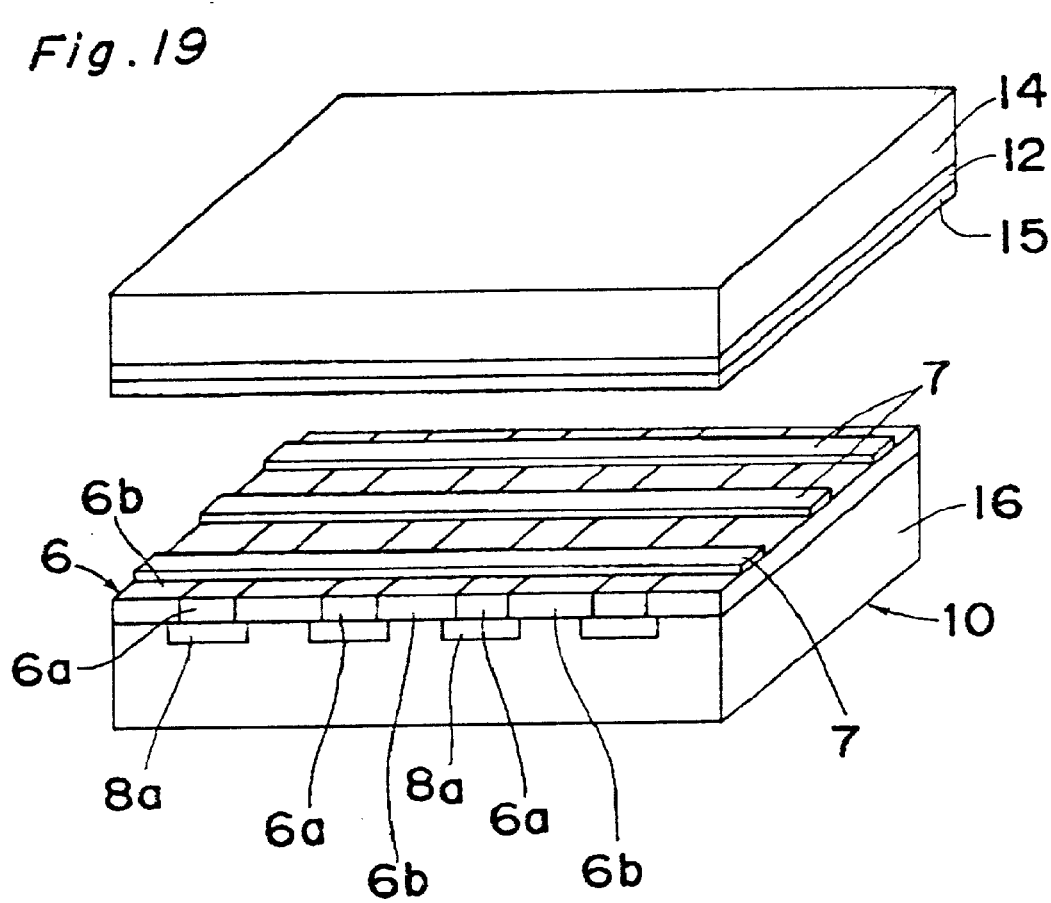
FIG. 19 is a perspective view of another field emission-type electron source according to the present invention, in which the conductive substrate is composed of a p-type silicon substrate.

As shown in FIG. 19, in the construction according to Embodiment 6, a glass plate 14 is disposed so as to face the electron source 10. On the surface of the glass plate 14, which faces the electron source 10, there are provided a collector electrode 12 and a fluorescent layer 15. Those members constitute a display. The fluorescent layer 15, which is applied on the surface of the collector electrode 12, emits visible light due to the electrons emitted from the electron source 10. To the collector electrode 12, there is applied a voltage for accelerating the emitted electrons, which make the fluorescent layer 15 emits light. Meanwhile the glass plate 14 is disposed apart from the electron source 10 by means of not-shown spacers. The sealed space formed between the glass plate 14 and the electron source 10 is held in a vacuum condition.

Figure 20:
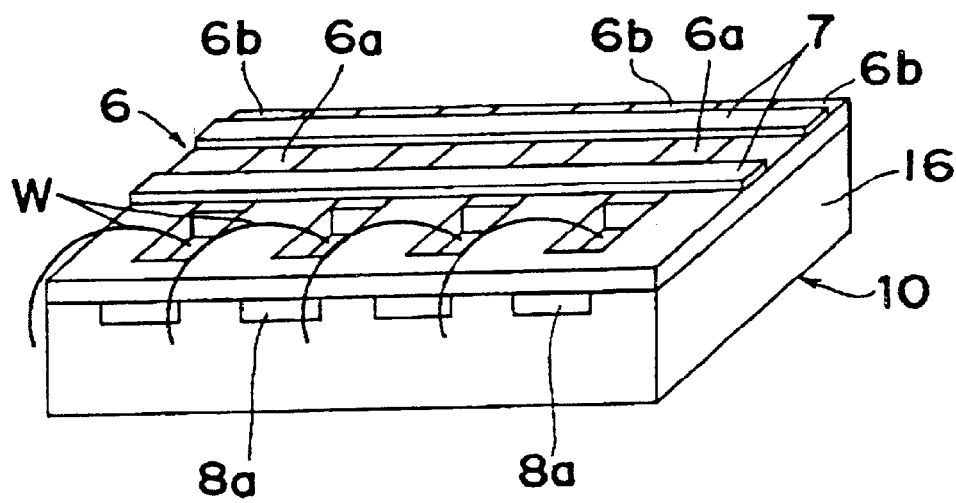
FIG. 20 is a perspective view of the field emission-type electron source shown in FIG. 19, in which contact portions are formed.
Figure 21:
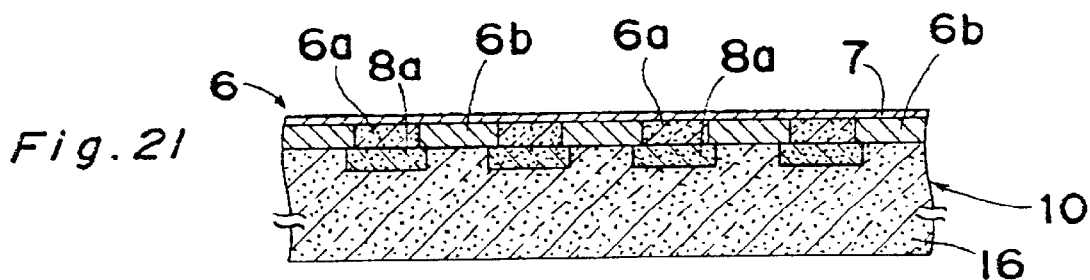
FIG. 21 is a sectional elevation view of the field emission-type electron source shown in FIG. 19.

As shown in FIGS. 19 to 21, the electron source 10 is provided with a p-type silicon substrate 16. On the main surface side of the p-type silicon substrate 16, there is provided a conductive substrate, in which a plurality of n-type regions 8a are formed as the conductive layers, each of regions having a striped shape Meanwhile, the electron source 10 is provided with a porous semiconductor layer 6, which has porous semiconductor portions 6a composed of porous polycrystalline silicon formed so as to overlap with the n-type regions 8a corresponding thereto respectively, and separator portions 6b composed of polycrystalline silicon burying the gaps among the porous semiconductor portions 6a (drift portions), the surfaces of the both portions forming one flat surface. Further, on the porous semiconductor layer 6, there are provided a plurality of conductive thin films 7 (surface electrodes) composed of, for example, thin metal films, each of the films 7 extending over the porous semiconductor portions 6a and the separator portions 6b in the direction perpendicular to the n-type regions 8a, and further being formed in a striped shape.

In the electron source 10, the p-type silicon substrate 16 is used as the conductive substrate, and the n-type region 8a is used as the conductive layer. However, the conductive substrate is not limited to the p-type silicon substrate 16. Meanwhile, the conductive film is not limited to the n-type region 8a. For example, there may be used such a conductive substrate that a conductive layer composed of a thin metal film such as a chrome film or ITO is provided on an insulating substrate such as a glass plate. Hereupon, if there is used a substrate in which the conductive film is formed on the surface of the glass plate, the area of the electron-emitting surface of the electron source 10 can be enlarged in comparison with the case using the semiconductor substrate so that the cost may be reduced. A material for the glass plate may be selected from quartz glass, non-alkali glass, low-alkali glass, soda lime glass or the like, in accordance with the process temperature during the manufacturing process.

In the electron source 10, between the n-type regions 8a of striped shape and the conductive thins films 7 of striped shape disposed perpendicular to the n-type regions 8a the porous semiconductor portions 6a of the porous semiconductor layer 6 are interposed. When a pair of one conductive thin film 7 and one n-type region 8a are conveniently selected and voltage is applied between the pair, the strong electrical field is applied only to the porous semiconductor portion 6a corresponding to the intersection of the selected conductive thin film 7 and n-type region 8a, and then the electrons are emitted. That is, it say be equivalent that the electron source 10 is disposed at the lattice point of the lattice composed of the conductive thin films 7 and the n-type regions 8a. Thus, the electrons can be emitted from desired lattice points by selecting pairs of the conductive thin films 7 and the n-type regions 8a, to which the voltage is applied. Thus, images or letters can be displayed on the screen of the display.

As shown in FIG. 20, the contacts to the n-type regions 8a are formed by etching the end portions of the porous semiconductor portions 6a to expose parts of the n-type regions. Thus, the contacts are connected to the outer circuit via electrical wires W. Hereupon, the concentration of the carrier in the n-type regions 8a is set to $1\times10^{18}$–$5\times10^{19}$ cm$^{-3}$. The voltage applied between the n-type region 8a and the conductive thin film 7 is set to about 10–30V.

Hereinafter, the manufacturing process of the electron source 10 according to Embodiment 6 will be described.

Figure 22A:
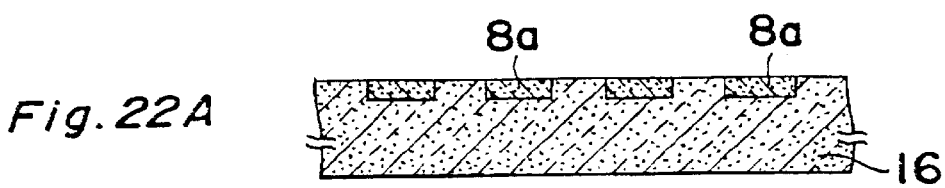
FIGS. 22A to 22F are sectional elevation views showing intermediate products or a final product in the main steps of the process for manufacturing the field emission-type electron source shown in FIG. 21.

At first, in order to obtain the construction shown in FIG. 22A, a mask for the ion implantation or thermal diffusion is provided on the main surface of the p-type silicon substrate 16. Next, the n-type regions 8a of striped shape are formed by introducing the dopant such as phosphorus (P) to the main surface of the p-type silicon substrate 16 by means the ion implantation process or the thermal diffusion process. Then, the mask is removed.

Figure 22B:
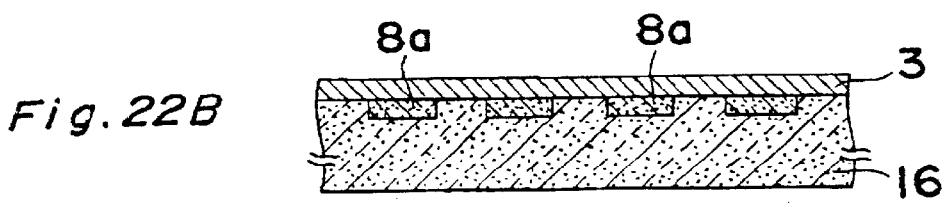

Next, on the main surface of the p-type silicon substrate on which the n-type regions 8a are formed, the non-doped polycrystalline silicon layer 3 of 1.5 μm thickness is formed by means of the LPCVD process so that the construction shown in FIG. 22B is obtained. Hereupon, p-type regions of higher impurity concentration may be provided among the n-type regions 8a. In the film forming conditions of the polycrystalline silicon layer 3, the pressure is 20 Pa, the substrate temperature is 640° C., and the flow rate of the monosilane gas is 600 sccm. However, the film-forming process of the polycrystalline silicon layer 3 is not limited to the LPCVD process. For example, after an amorphous silicon layer has been formed by means of the sputter process or the plasma CVD process, the polycrystalline silicon layer 3 may be formed by performing the anneal process to the amorphous silicon layer to crystallize it. Meanwhile, if the conductive substrate is a substrate in which the conductive film such as ITO or the like is formed on the glass plate, the polycrystalline silicon layer 3 may be formed by forming an amorphous silicon film on the conductive thin film by means of the CVD process and annealing it. Meanwhile, the CGS (Continuous Grain Silicon) process or the catalytic CVD process may be used in order to form the polycrystalline silicon layer 3. Hereupon, the thickness of the polycrystalline silicon layer 3 may be larger than or equal to the predetermined thickness of the porous semiconductor layer 6 formed by the pore formation process.

Figure 22C:

After that, on the polycrystalline silicon layer 3, a photo resist is applied to form a layer thereof as a mask layer. Then, the layer is partially removed using the photolithography technique to form holes at positions above the n-type regions 8a so that resist layers 9, which are patterned to striped shapes as shown in FIG. 22C, are formed.

Hereupon, although the resist layer 9 is utilized as the mask layer for the anodic oxidation process, a silicon oxide film or silicon nitride film of striped shape may be utilized as the mask layer. In this case, the silicon oxide film or silicon nitride film is formed by means of the CVD process or sputter method. Then, the polycrystalline silicon layer 3 is partially removed using photolithography technique and the etching (wet or dry etching) technique to form holes at positions above the n-type regions 8a. If the silicon oxide film or silicon nitride film is used, the mask layer need not be removed after the anodic oxidation process for the polycrystalline silicon layer 3.

Further, on the back surface of the p-type silicon substrate 16, the ohmic electrode, which is not shown, is formed. Then, the porous semiconductor portions 6a composed of porous polycrystalline silicon are formed on the polycrystalline silicon layer 3 by performing the anodic oxidation process thereto utilizing the resist layer 9 as the mask.

Figure 23:
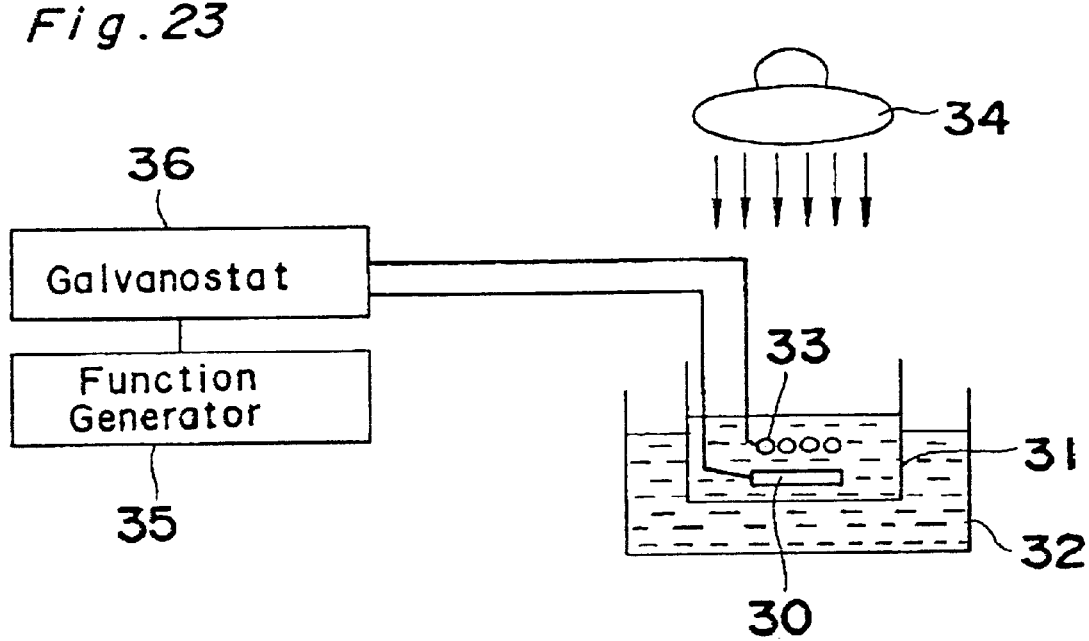
FIG. 23 is a schematic view of an anodic oxidation apparatus for manufacturing the field emission-type electron source shown in FIG. 19.

The anodic oxidation is performed using the apparatus shown in FIG. 23. Hereupon, a processing tank 31 containing electrolyte in which hydrofluoric acid, ethanol and water are suitably mixed together, is put into a constant temperature water bath 32 so that the temperature of the electrolyte is controlled.

The process object 30, in which the conductive substrate and the polycrystalline silicon layer 3 are formed on the p-type silicon substrate 16 as shown in FIG. 22C, and the counter electrode 33, namely a platinum electrode, are immersed in the electrolyte. Thus, the current is applied between the p-type silicon substrate 16 and the counter electrode 33. In the present embodiment, there is used an electrolyte in which hydrogen fluoride aqueous solution of 55 wt % and ethanol are mixed together in the ratio of nearly 1:1.

On that occasion, light with a constant light power is applied from a tungsten lamp 34 of 500 W to the exposed portion of the polycrystalline silicon layer 3. The pattern of the current flowing between the p-type silicon substrate 16 and the counter electrode 33 is controlled by a function generator 35 and a galvanostat 36. Hereupon, the function generator 35 controls the current polarity, current-fed time and the degree (larger, smaller) of the current. The galvanostat 36 (galvanometer) feeds current. Hereupon, the anodic oxidation process may be performed by applying the voltage instead of the current. In this case, a potentiostat (potentiometer) may be used instead of the galvanostat 36.

According to the current pattern in the present embodiment, the current is continuously fed in such a manner that the p-type silicon substrate 16 acts as the positive electrode. The current-fed time and the current density are conveniently set in accordance with the composition and temperature of the electrolyte. That is, the amount of the electric charge during the anodic oxidation process is adjusted in accordance with the composition or temperature of the electrolyte. As described above, if the electrolyte, in which hydrofluoric acid, ethanol and water are mixed together, is used, it is preferable that the temperature of the electrolyte is controlled so as to be in the range from 0° C. to the room temperature. Further, it is desirable that the current or voltage is controlled so that the current density is in the range of 1 to 200 mA/cm$^2$. When the total amount of the electric charge is controlled by the process time while holding the current density during the anodic oxidation process to a constant value as the present embodiment, the depth of the region, which is made porous, is determined in accordance with the amount of the electric charge. In consequence, the depth of the region, which is made porous, can be easily controlled on the basis of the amount of the electric charge. Therefore, the thickness of the porous structures 25 can be made smaller without changing the porosity thereof, by shortening the process time of the anodic oxidation process.

For example, when the current density is set to 25 mA/cm$^2$ while the current is fed for 6 seconds in the anodic oxidation process, the porous structures 25 can be made thinner so that the thickness of the region, which is made porous, is not larger than 2 µm. The thickness of the polycrystalline silicon layer 3 is set to 1.5 µm in the present embodiment, the pore formation is performed by setting the current density in the anodic oxidation process to 25 mA/cm$^2$ while feeding the current for 3 seconds. Hereupon, the formed porous polycrystalline silicon layer becomes the porous semiconductor layer 6 in which the columnar structures 21 and the porous structure 25 coexist. If the porous semiconductor layer 6 is formed by making the uni-plane semiconductor layer porous so that the porous semiconductor layer 6 maintains its uni-plane state, the conductive thin film 7 formed on the surface of the porous semiconductor layer 6 in the later step, hardly become net-shape. In consequence, the in-plane dispersion of the amount of the emitted electrons hardly occurs. Further, the deterioration of the communication due to snap hardly occurs.

Meanwhile, if the current density is set to a value smaller than or equal to 1.5 mA/cm$^2$ in the anodic oxidation process so that the anodic oxidation process is performed for a long time while suitably selecting the composition of the electrolyte, the polycrystalline is not made porous while the surface layer is electro-polished so that irregularity on the surface due to the growth of the grains may not occur. Therefore, the surface of the porous semiconductor layer 6 becomes parallel to the surface of the conductive substrate (n-type regions 8a). Then, if the above-mentioned anodic oxidation process is performed, the electrical field is uniformly applied to the substrate in the direction perpendicular to the substrate so that the direction that the pore formation progresses becomes also perpendicular to conductive substrate. Therefore, the direction that the pore formation of the porous structures 25 progresses is uniformed. Hereupon, the electrons are accelerated by the electrical field in the porous structures 25. If the pore-forming direction is uniform and perpendicular to the substrate, the electron-emitting direction is also uniform and perpendicular to the substrate. Therefore, if the electron source is applied to a display or the like, much higher definition may be achieved. Further, if the polycrystalline silicon layer 3 is made porous using the silicon oxide or silicon nitride as a mask, the etching may be performed for a period longer than the predetermined period when the open holes are formed in the silicon oxide film or the silicon nitride film by the RIE process. In this case, if the surface layer of the polycrystalline silicon layer is merely etched, irregularity of the surface due to the growth of the grains does not occur so that the same effects as described may be obtained. Further, the above-mentioned method for smoothing the surface of the polycrystalline silicon layer does not require adding a further new step. Therefore, the above-mentioned effects may be obtained without increasing the cost.

The porous semiconductor layer 6 may be formed using materials except polycrystalline silicon. For example, the semiconductor layer such as monocrystalline silicon, germanium, gallium arsenide (GaAs) may be formed on the n-type region with a predetermined thickness by means of the MOCVD process or the MBE process. Then, the fine pores may be formed in the predetermined depth by the RIE process or the FIB process. In this case, for example, the above-mentioned construction can be formed by dispersing the fine crystal powder composed of the above-mentioned material with the spin-on-glass, burying the paste into fine pores, and then performing the heat treatment.

Figure 22D:
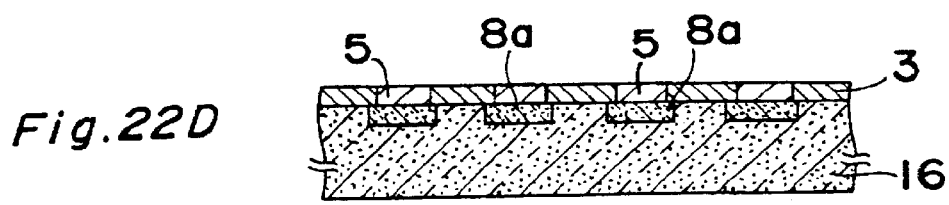

By means of the above-mentioned anodic oxidation process, the porous polycrystalline silicon layer with striped shape is formed so that it becomes the porous semiconductor portion 5 before the formation of the insulating layer. Then, the construction shown in FIG. 22D is obtained by removing the resist layer 9. Thus, pore formation has progressed to a halfway in the thickness direction of the polycrystalline silicon layer 3. Moreover, the current-flowing direction is mutually changed during the anodic oxidation process, and further the current is fed in a pulsing state. Therefore, as shown in FIG. 15, the thickness of the porous structures 25 (porous regions) may be approximately uniformed.

Figure 22E:
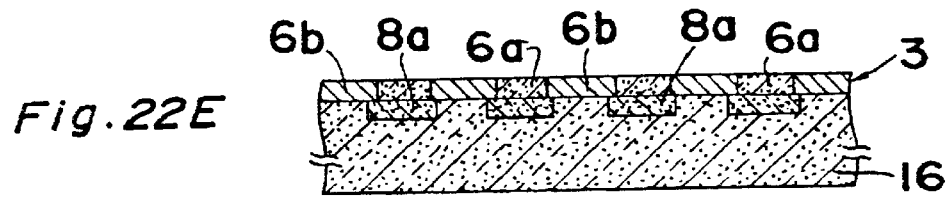

After the anodic oxidation process, the rapid thermal oxidation (RTO) is performed to the porous polycrystalline silicon layer 5 in the dry oxygen atmosphere using a lamp anneal apparatus. In consequence, the porous structures composed of the porous polycrystalline silicon 5, which is thermally oxidized, is formed so that the construction shown in FIG. 22E is obtained. If the rapid thermal oxidation is used, it may be possible that the temperature is elevated to the oxidation temperature in a several seconds. Therefore, the involvement oxidation in the initial stage, which is at issue in the normal oxidation apparatus of core internal structure, is restrained. In the rapid thermal oxidation according to the present embodiment, the flow rate of oxygen gas is 300 sccm, the oxidation temperature is 900° C., and the oxidation time is 1 hour.

Figure 22F:
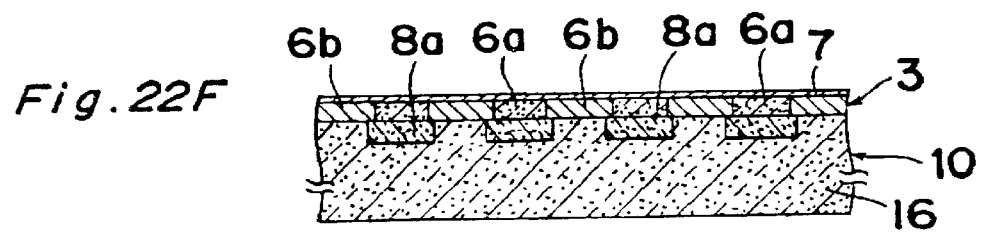

Hereupon, as the process for oxidizing the porous polycrystalline silicon layer, the plasma oxidation, the electrochemical oxidation (for example, oxidation using acid), or the oxidation using UV or ozone may be used, instead of the rapid thermal oxidation. Further, the porous polycrystalline silicon layer may be nitrified, without using the oxidation Then, on the polycrystalline silicon layer, the conductive thin film 7 with striped shape, which is composed of a thin gold film, is formed by the evaporation process using a metal mask having an open pattern with striped shape so that the construction shown in FIG. 22F is obtained. The thickness of the conductive thin film 7 is 10 nm. The process for forming the conductive thin film 7 is not limited to the evaporation process. For example, the sputter process may be used. As the process for patterning the conductive thin film 7, the photolithography technique and the etching technique may be used. Alternatively, the photolithography technique and the lift off process may be used.

Hereupon, although the resist layer 9 is used as a mask layer during the anodic oxidation process, a silicon oxide film or silicon nitride film, which is formed in a striped shape, may be used as a mask layer. When the silicon oxide film or silicon nitride film is used, the step for removing the mask layer after the anodic oxidation process is not required. Further, an insulating layer may be provided between the conductive thin film and the polycrystalline silicon layer at a position where the electrons are not emitted.

Further, the electron-emitting phenomenon is such a phenomenon that the electrons, which have reached the surface of the porous semiconductor layer, are emitted from the surface of the conductive thin film 7 into the vacuum atmosphere using the tunnel effect, by applying the electrical field to the porous semiconductor layer in such a manner that the conductive thin film 7 acts as the positive electrode. Therefore, an ideal energy of the electrons is the energy difference obtained by subtracting the energy of the work function of the conductive thin film 7 from the energy of the electrons obtained by applying voltage between the conductive substrate and the conductive thin film 7. Therefore, the smaller the work function of the conductive thin film 7 is, it is more desirable. As the materials for the conductive thin film 7, aluminum, chrome, tungsten, nickel, platinum or alloys of the above may be used, in addition to gold. Moreover, the thickness of the conductive thin film 7 is 10 nm. However, the thickness may be conveniently selected, if only the electrons, which have passed through the porous semiconductor layer 6, can tunnel.

When the anodic oxidation process is performed, the current may be fed in a pulsing state, instead of feeding the current continuously. Further, the process may be controlled by voltage, instead of the current. If the current is fed in a pulsing state, the current is fed intermittently so that the progress rate of the anodic oxidation can be lowered in comparison with the case that the current is continuously fed. Therefore, the thickness of the porous structures (regions to be made porous) may be easily controlled.

(Embodiment 7)

Hereinafter, Embodiment 7 of the present invention will be described.

In Embodiment 6, the anodic oxidation process for the polycrystalline silicon is performed such that the current is fed with a constant current density or fed in a pulse shape. On the contrary, in the current pattern according to Embodiment 7, a period that the p-type silicon substrate 16 acts as a positive electrode and a period that it acts as a negative electrode are mutually set, while pulse current (current of pulse shape) is fed to each period.

According to the above-mentioned current pattern, the pore formation progresses during the period that the p-type silicon substrate 16 acts as the positive electrode. On that occasion, in the porous structures (regions made porous), the thickness of the polycrystalline silicon layer becomes smaller so that the electrical field converges there, in consequence the current can easily flow there. On the other hand, during the period that the p-type silicon substrate 16 acts as the negative electrode, gas is produced near the porous structures 25 due to the electrical field convergence. Therefore, in the position where the pore formation has rapidly progressed during the above-mentioned period that the p-type silicon substrate 16 acts as the positive electrode, the pore formation would be restrained during the next period that the pore formation progresses. The above-mentioned phenomena are repeated so that the thickness of the porous structures 25 is approximately uniformed as shown in FIG. 15.

Figure 24:
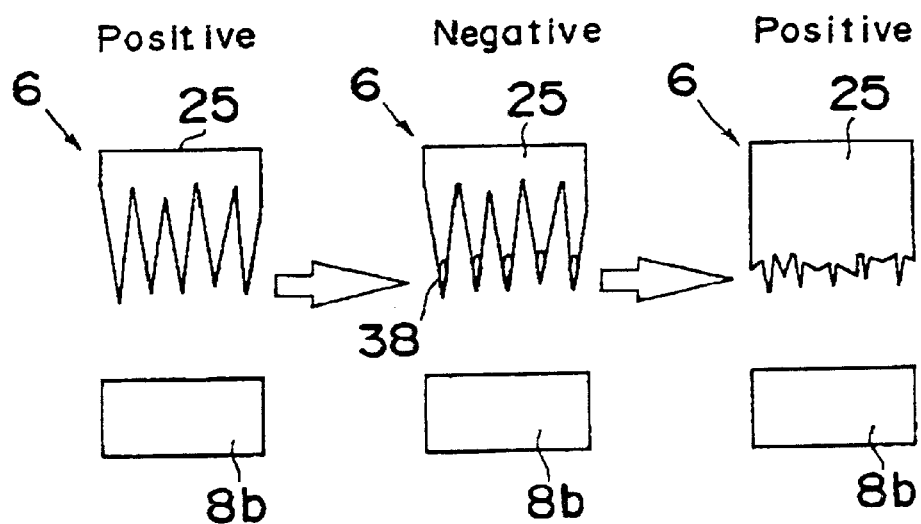
FIG. 24 is a schematic view showing the condition that the pore formation progresses, when the anodic oxidation is performed while changing the polarity mutually.

As shown in FIG. 24, concretely, in the process for forming the porous semiconductor layer 6, the polarity of the anodic oxidation process is mutually reversed by the pulse. On that occasion, the pore formation progresses during the period that the substrate is positive electrode. Hereupon, the state of the pore formation disperses in accordance with the shape of the surface or the condition of the semiconductor. Thus, when the polarity is reversed so that the substrate becomes negative electrode, the electrical field converges at the position where the pore formation has rapidly progressed so that the carriers converge at the position. In consequence, a large amount of gas 38 is produced at the position. At the portion where the gas 38 has been produced, the contact between the portion and the electrolyte is snapped so that the pore formation hardly progresses when the substrate becomes positive electrode next. The above-mentioned steps are repeated so that the thickness of the porous structures 25 is uniformed all over the plane. If the thickness of the porous structures 25 is uniformed as described above, the electron source 10, in which the in-plane distribution (dispersion) is extremely small, may be achieved.

The current-fed period per one pulse current (namely, pulse width), or the current density per one pulse may be conveniently selected in accordance with the composition and temperature of the electrolyte. That is, the amount of the electric charges during the anodic oxidation process is adjusted by the composition and temperature of the electrolyte. Concretely, as same as the case of Embodiment 6, the condition of the light application is set in accordance with the composition and temperature of the electrolyte. Hereupon, it is preferable that the pulse current is fed in such a manner that the current density is set to 1 to 200 mA/cm$^2$ during the period that the p-type silicon substrate 16 acts as the positive electrode, while the current density is set to −2 to −100 mA/cm$^2$ during the period that the p-type silicon substrate 16 acts as the negative electrode. Meanwhile, it is preferable that the time for feeding the pulse current during the period that the substrate is positive, is shorter than or equal to 1 second.

In the present embodiment, during the anodic oxidation process, the current-flowing direction is mutually reversed, and further the current is fed in a pulse shape. In consequence, the thickness of the porous structures 25 (regions made porous) in the porous semiconductor layer 6 becomes approximately uniform. Further, it is possible that the dispersion of the thickness in the depth direction of the porous structures 25 is smaller than or equal to 0.5 μm. Thus, the damage of the n-type region 8a due to the electrolyte may be prevented, by controlling such that a part of the porous structures 25 does not previously reach the n-type region 8a. Further, the thickness of the porous structures in the porous semiconductor layer 6 is approximately uniformed. In consequence, in the porous semiconductor portion 6a selected by the n-type regions 8a and the conductive thin films 7, the electrons can be emitted from the whole surface. In consequence, in comparison with the case that the thickness of the porous structures 25 is ununiform, the electron-emitting efficiency is elevated so that the amount of the emitted electrons is increased. Other constructions and functions are as same as the case of Embodiment 6.

(Embodiment 8)

Hereinafter, Embodiment 8 of the present invention will be described.

In Embodiment 8, there is used a substrate in which a platinum electrode as the conductive layer is provided on a surface of a glass plate. Materials for the glass plate may be selected from quartz glass, non-alkali glass, low-alkali glass or soda lime glass, in accordance with the process temperature during the manufacturing process. Hereupon, platinum is used as the conductive layer, because it has an anticorrosion against hydrofluoric acid.

Figure 25A:
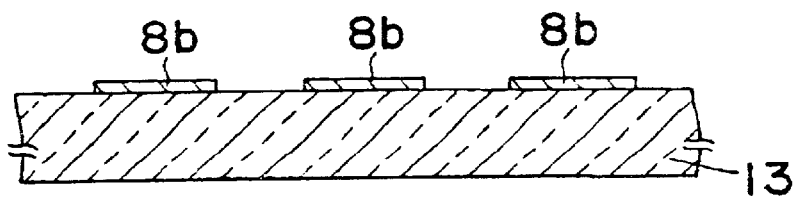
FIGS. 25A to 25D are sectional elevation views showing intermediate products or a final product in the main steps of the process for manufacturing another field emission-type electron source according to the present invention, type source having a conductive substrate in which a conductive film is formed on a glass plate.

As shown in FIG. 25A, on a surface of an insulating substrate 13 composed of a glass plate, a conductive layer 8b composed of a thin platinum film with 0.2 μm thickness is formed by means of the sputter process. Then, the conductive layer 8b is pattered to a stripe shape by means of the ion milling process. The process for forming the conductive layer 8b (thin platinum film) is not limited to the sputter process. For example, the evaporation process may be used.

Figure 25B:
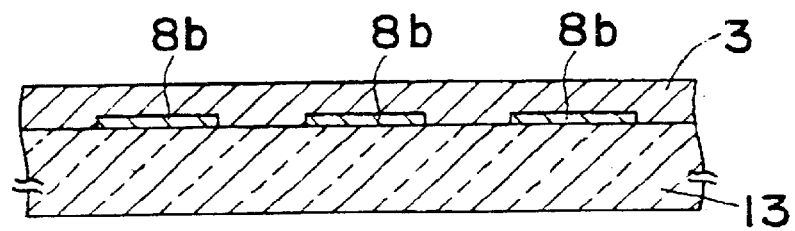

Next, as shown in FIG. 25B, a non-doped polycrystalline silicon layer 3 is formed so as to have a thickness of 0.5 μm and to cover the insulating substrate 13 and the conductive layer 8b.

Figure 25C:
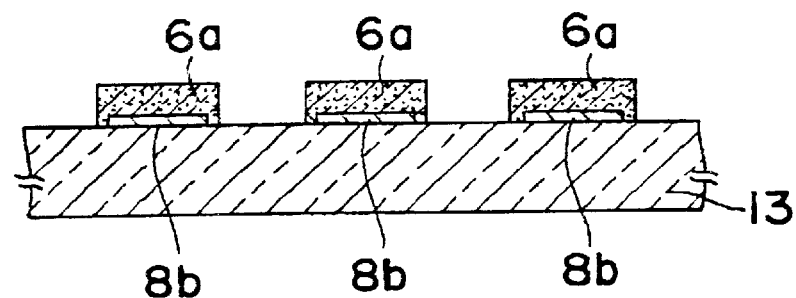

Further, as shown in FIG. 25C, the polycrystalline silicon layer 3 is pattered so as to keep the portion thereof located above the conductive layer 8b by means of the RIE process. By the patterning, there is formed a pattern corresponding to the shape of the porous semiconductor portion 6a in the porous semiconductor layer 6. Then, the anodic oxidation process as same as that of Embodiment 6 or 7 is performed in such a manner that the conductive layer 8b acts as an electrode so that the polycrystalline silicon layer is made porous. The depth of the pore formation is set to a value which is approximately equal to the thickness of the polycrystalline silicon layer 3 so that the region of the pore formation nearly reaches the conductive layer 8b. Hereupon, if the electrolyte contains hydrofluoric acid during the anodic oxidation process, the conductive layer 8b is not corroded because the conductive layer has anticorrosion against hydrofluoric acid. After the anodic oxidation process, the porous semiconductor portion 6a composed of porous polycrystalline silicon which is thermally oxidized, is formed by means of the rapid thermal oxidation (RTO) process in the dry oxygen atmosphere using a lamp anneal apparatus. In accordance with the kind of the glass, the plasma oxidation process or the electrochemical oxidation process (for example, using acid) may be used.

Figure 25D:
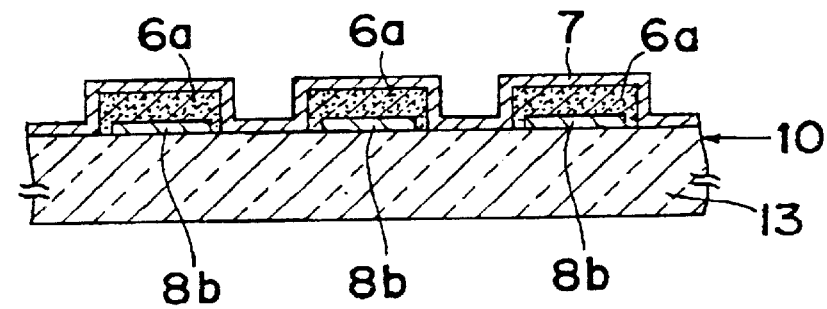

Then, as shown in FIG. 25D, a conductive thin film 7 (surface electrode) composed of a thin gold film is formed by means of the EB evaporation process so as to cover the insulating substrate 13 and the porous semiconductor portion 6a. Further, the conductive thin film 7 (surface electrode) with stripe shape is formed by patterning so that the electron source 10 is completed.

Hereupon, in the present embodiment, the polycrystalline silicon layer is provided on the insulating substrate 13. Therefore, a driving circuit or the like of the electron source 10 and the insulating substrate 13 may be formed together, by forming a semiconductor device which utilizes the polycrystalline silicon layer around the electron source 10.

In the present embodiment, the thickness of the porous structures (regions made porous) in the porous semiconductor portion 6a is approximately equal to the thickness of the polycrystalline silicon layer. Therefore, the whole voltage is applied to the porous structures in the porous semiconductor portion 6a. In consequence, the applied voltage can be utilized for emitting the electrons without causing voltage loss so that the amount of the emitted electrons may be increased. In the present embodiment, there is used such a conductive substrate that the conductive layer 8b composed of platinum is provided on the insulating substrate 13. However, other materials may be used instead of platinum, if only they have anticorrosion against hydrofluoric acid. Meanwhile, the conductive layer 8b may be formed, by protecting other conductive materials with anticorrosive materials. Other constructions and functions are as same as the case of Embodiment 6.

(Embodiment 9)

Hereinafter, Embodiment 9 of the present invention will be described.

As shown in FIG. 9, the fundamental construction of the electron source according to Embodiment 9 is characterized in that, on the surface portion of the porous semiconductor layer 6 of Embodiment 6, a low-resistance layer 6c of predetermined thickness, whose resistance is lower in comparison with other parts 6d, is provided. Hereupon, the thickness of the low-resistance layer 6c is made smaller than the mean free path of the electrons in the low-resistance layer 6c. In consequence, the deterioration of the electron-emitting efficiency due to the low-resistance layer 6c may be restrained.

In the electron source 10 according to the present embodiment, when the electrical field is applied thereto, the low-resistance layer 6c acts as a mimic electrode so that the surface portion of the porous semiconductor layer 6 has a uniform electrical potential. In consequence, even if the porous semiconductor layer 6 does not partially contact to the conductive thin film 7 composed of a thin gold film, the electrical field is uniformly applied to the porous semiconductor layer in the plane. Therefore, the dispersion of the amount of the emitted electrons at the plane may be restrained. Thus, when the electron source 10 is applied to a display, the brightness dispersion on the screen may become smaller.

Hereinafter, the process for forming the low-resistance layer 6c will be described. Hereupon, a process for forming a low-porosity layer is described as the low-resistance layer 6c.

In the anodic oxidation process according to Embodiment 6, the current density is changed during the anodic oxidation process, while applying light thereto with a constant light power. Hereupon, the current density is set to a smaller value during a predetermined initial period of the anodic oxidation process, and then the current density is increased after the predetermined initial period. In consequence, on the upper surface of the porous polycrystalline silicon layer whose porosity is larger, the porous polycrystalline silicon layer, whose porosity is smaller and whose resistance is lower, is formed. Hereupon, the light power may be changed during the anodic oxidation process while holding the current density at a constant value, as same as the case of Embodiment 6. In this case, the light power applied to the surface is set to a smaller value during a predetermined initial period of the anodic oxidation process, and then the light power is increased after the predetermined initial period. If so, the same construction as described above may be achieved.

According to the above-mentioned manufacturing process, in the step of forming the porous polycrystalline silicon layer, the porous polycrystalline silicon layer (low-resistance layer) whose porosity is smaller, can be simultaneously formed at the surface portion of the porous polycrystalline silicon layer. Therefore, the electron source 10, in which the in-plane dispersion of the emitted electrons is smaller, can be achieved with a low cost, without individually adding a further new step for forming the low-resistance layer 6c.

Concretely, if the thickness of the polycrystalline silicon layer is, for example, 1.5 µm, the current density during the anodic oxidation process is set to a constant value of 3 mA/cm² for the initial 4 seconds, and set to a constant value of 30 mA/cm² for the following 10 seconds. The porosity of the porous polycrystalline silicon layer is determined in accordance with the current value during the anodic oxidation. Thus, the porosity in the surface portion of the porous polycrystalline silicon layer becomes smaller than the other portion of the porous polycrystalline silicon layer.

(Embodiment 10)

Hereinafter, Embodiment 10 of the present invention will be described. Hereupon, the electron source 10 according to Embodiment 10 is as same as that of Embodiment 9. Merely, the manufacturing process is different. Namely, it is characterized in that the low-resistance layer 6c provided in the surface portion of the porous semiconductor layer 6 is formed by oxidizing (or nitrifying) the recrystallized layer, which is formed by re-crystallizing the surface portion of the porous polycrystalline silicon layer 4. Therefore, only the manufacturing process of the electron source 10 according to the Embodiment 10 will be described below. Hereupon, the process except forming the low-resistance layer 6c is as same as that of Embodiment 9. That is, the porous polycrystalline silicon layer 4 is formed by making the polycrystalline silicon layer 3 porous is by means of the anodic oxidation process. Hereupon, because each of the current density and light power during the anodic oxidation process is constant, the porosity of the porous polycrystalline silicon layer is uniform in the thickness direction thereof.

Figure 26A:
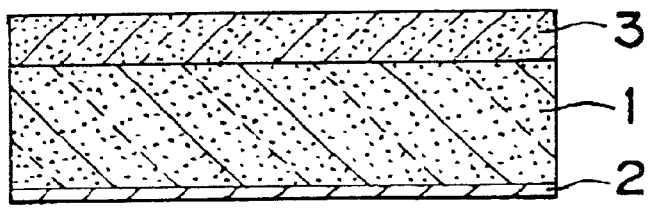
FIGS. 26A to 26D are sectional elevation views showing intermediate products or a final product in the main steps of the process for manufacturing another field emission-type electron source according to the present invention, the source having a conductive substrate composed of an n-type silicon substrate.

As shown in FIG. 26A, in the manufacturing process of the electron source 10, an ohmic electrode 2 is formed on the back surface of a conductive substrate 1 composed of an n-type silicon substrate. Next, on the upper surface of the conductive substrate 1, a polycrystalline silicon layer 3 is formed so that the construction shown in FIG. 26A is obtained.

Figure 26B:
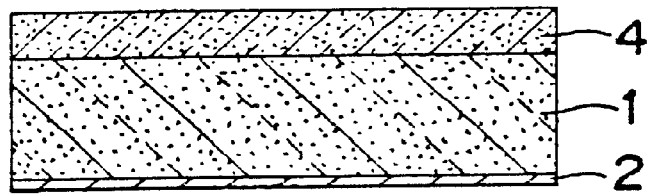

Then, a porous polycrystalline silicon layer 4 is formed by making the polycrystalline silicon layer 3 porous by means of the anodic oxidation process so that the construction shown in FIG. 26B is obtained. In the present embodiment, because each of the current density and light power during the anodic oxidation process is constant, the porosity of the porous polycrystalline silicon layer 4 is uniform in the thickness direction thereof.

Figure 26C:
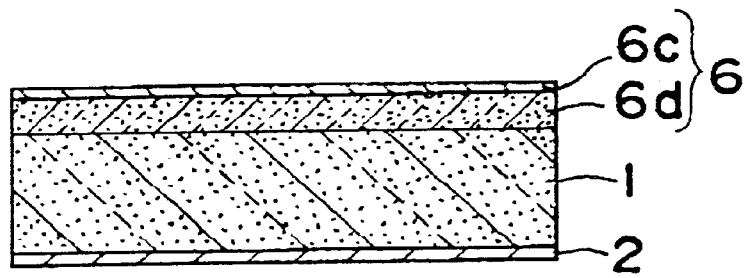

After the porous polycrystalline silicon layer 4 has been formed, the surface portion of the porous polycrystalline silicon layer 4 is re-crystallized by means of the laser anneal process. Then, a porous semiconductor layer 6 including a low-resistance layer 6c is formed, by oxidizing (or nitrifying) the porous polycrystalline silicon layer 4 so that the construction shown in FIG. 26C is obtained. Hereupon, when the surface portion of the porous polycrystalline silicon layer 4 is re-crystallized by means of the laser anneal process, for example, argon laser or excimer laser may be applied to the surface of the porous polycrystalline silicon layer 4.

Figure 26D:
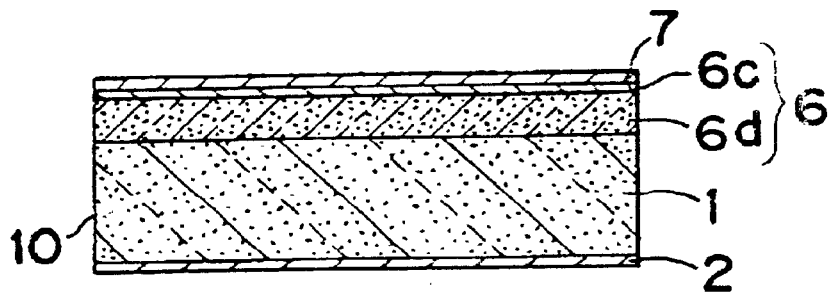

After the porous semiconductor layer 6 has been formed, on the porous semiconductor layer 6 (namely, on the low-resistance layer 6c) a conductive thin film 7 composed of a thin gold film is formed so that the electron source 10 having the construction shown in FIG. 26D is obtained.

Thus, in the present embodiment, the surface portion, which is re-crystallized by means of the laser anneal process, becomes the low-resistance layer 6c. In consequence, the low-resistance layer 6c may be easily provided comparatively. Therefore, the electron source 10, in which the in-plane dispersion of the emitted electrons is smaller, can be achieved with a low cost.

Further, in the electron source 10 according to the present embodiment, the same effects as that of Embodiment 9 may be obtained. Moreover, because the low-resistance layer 6c is composed of the re-crystallized layer, which is formed by re-crystallizing the surface portion of the porous polycrystalline silicon layer 4, the irregularity of the surface of the porous semiconductor layer 6 becomes less. In consequence, it may be restrained that the electrical field converges at the apexes of the convex portions or the bottom of the concave portions on the surface of the porous semiconductor layer 6. Therefore, when the electron source 10 is applied to a display etc., it may be prevented that only specific spots become bright so that the brightness dispersion in the plane may become smaller.

(Embodiment 11)

Hereinafter, Embodiment 11 of the present invention will be described. Hereupon, the electron source 10 according to Embodiment 11 is as same as that of Embodiment 9. Merely, the manufacturing process is different. The present embodiment is characterized in that the low-resistance layer 6c is formed by oxidizing (or nitrifying) the impurity-implanted layer, which is formed by implanting impurity ions (for example, phosphorus, boron or the like) into the porous polycrystalline silicon layer 4 through the surface thereof.

The manufacturing process of the electron source 10 is approximately as same as that of Embodiment 10. The difference is as follows. Namely, after the porous polycrystalline silicon layer 4 (see FIG. 26B) has been formed, impurity ions are implanted into the porous polycrystalline silicon layer 4 through the surface thereof by means of the ion implantation process. Then, the low-resistance layer 6c is formed by oxidizing (or nitrifying) the porous polycrystalline silicon layer 4.

Thus, in the present embodiment, after impurity ions are implanted into the surface portion of the porous polycrystalline silicon layer 4, the surface portion is oxidized (or nitrified) to become the low-resistance layer 6c. In consequence, the low-resistance layer 6c can be provided with a good controllability so that the electron source 10, in which the in-plane dispersion of the amount of the emitted electrons is smaller, may be achieved with a low cost.

Further, in the electron source 10 according to the present embodiment, the same effects as that of Embodiment 9 may be obtained. Moreover, because the low-resistance layer 6c is composed of the impurity-implanted layer, which is formed by implanting impurity ions into the porous polycrystalline silicon layer 4 through the surface thereof, the concentration or distribution of the impurity of the low-resistance layer 6c may be easily controlled.

(Embodiment 12)

Hereinafter, Embodiment 12 of the present invention will be described. Hereupon, the electron source 10 according to Embodiment 12 is as same as that of Embodiment 9. Merely, the manufacturing process is different. The present embodiment is characterized in that the low-resistance layer 6c is formed by oxidizing (or nitrifying) the impurity-diffused layer, which is formed by diffusing an impurity (for example, phosphorus, boron or the like) into the porous polycrystalline silicon layer 4 from the surface thereof.

The manufacturing process of the electron source 10 is approximately as same as that of Embodiment 10. The difference is as follows. Namely, after the porous polycrystalline silicon layer 4 (see FIG. 26B) has been formed, the impurity is diffused into the porous polycrystalline silicon layer 4 from the surface thereof by means of the diffusion process. Then, the low-resistance layer 6c is formed by oxidizing (or nitrifying) the porous polycrystalline silicon layer 4.

Thus, in the present embodiment, after the impurity is diffused into the surface portion of the porous polycrystalline silicon layer 4, the surface portion is oxidized (or nitrified) to become the low-resistance layer 6c. In consequence, the low-resistance layer 6c, which has a larger area of electron-emitting surface, can be comparatively easily provided. Therefore, the electron source 10, in which the in-plane dispersion of the amount of the emitted electrons is smaller, may be achieved with a low cost.

Further, in the electron source 10 according to the present embodiment, the same effects as that of Embodiment 9 may be obtained. Moreover, because the low-resistance layer 6c is composed of the impurity-diffused layer, which is formed by diffusing the impurity into the porous polycrystalline silicon layer 4 from the surface thereof. In this case, the area of electron-emitting surface may be larger in comparison with the case using the ion implanting process.

Although the present invention has been described in relation to particular embodiments thereof, many other variations and modifications will become apparent to those skilled in the art. It is preferred, therefore, that the present invention be limited not by the specific disclosure herein, but only by the appended claims.

The present disclosure relates to subject matter contained in priority Japanese Patent Application Nos. HEI 11-115717, filed on Apr. 23, 1999, HEI 11-295953, filed on Oct. 18, 1999, and HEI 11-295953, filed on Oct. 18, 1999, the contents of all being herein expressly incorporated by reference in their entireties.

What is claimed is:

1. A field emission-type electron source which comprises:
a conductive substrate;
a semiconductor layer formed on a surface of the conductive substrate, at least a part of the semiconductor layer being made porous; and
a conductive thin film formed on the semiconductor layer, in which electrons injected into the conductive substrate are emitted from the conductive thin film through the semiconductor layer by applying a voltage between the conductive thin film and the conductive substrate in such a manner that the conductive thin film acts as a positive electrode against the conductive substrate, wherein
the semiconductor layer includes a porous semiconductor layer in which columnar structures and porous structures composed of fine semiconductor crystals of nanometer scale coexist, a surface of each of the structures being covered with an insulating film, while an average dimension of each of the porous structures in a thickness direction of the semiconductor layer is smaller than or equal to 2 $\mu$m.

2. The field emission-type electron source according to claim 1, wherein thin film side end portions of the columnar structures and thin film side end portions of the porous structures are located on a same position in the thickness direction of the semiconductor layer.

3. The field emission-type electron source according to claim 1, wherein the porous semiconductor layer is composed of porous polycrystalline silicon formed by an anodic oxidation process.

4. The field emission-type electron source according to claim 1, wherein a difference between a maximum dimension and minimum dimension of the porous structures in the thickness direction of the semiconductor layer is smaller than or equal to 0.5 $\mu$m.

5. The field emission-type electron source according to claim 1, wherein thickness of the porous semiconductor layer is approximately equal to thickness of the semiconductor layer disposed between the conductive thin film and the conductive substrate.

6. The field emission-type electron source according to claim 1, wherein an anticorrosive conductive layer, which has an anticorrosion against an electrolyte for an anodic oxidation process used for making the semiconductor layer porous, is provided on a surface of the conductive substrate at a semiconductor layer side.

7. The field emission-type electron source according to claim 1, wherein a low-resistance layer of predetermined thickness is provided on a thin film side end portion of the porous semiconductor layer in the thickness direction of the semiconductor layer, the low-resistance layer having a lower resistance in comparison with other parts of the porous semiconductor layer.

8. The field emission-type electron source according to claim 7, wherein thickness of the low-resistance layer is smaller than a mean free path of the electrons in the semiconductor forming the low-resistance layer.

9. The field emission-type electron source according to claim 7, wherein the low-resistance layer is composed of a low-porosity layer having a smaller porosity in comparison with other parts of the porous semiconductor layer.

10. The field emission-type electron source according to claim 7, wherein the low-resistance layer is composed of a re-crystallized layer which is formed by re-crystallizing a surface portion of the porous semiconductor layer.

11. The field emission-type electron source according to claim 7, wherein the low-resistance layer is composed of an impurity-implanted layer which is formed by implanting impurity ions into the porous semiconductor layer through a surface of the porous semiconductor layer.

12. The field emission-type electron source according to claim 7, wherein the low-resistance layer is composed of an impurity-diffused layer which is formed by diffusing an impurity into the porous semiconductor layer through a surface of the porous semiconductor layer.

13. The field emission-type electron source according to claim 1, wherein a thin film side surface of each of the porous structures is parallel to a surface of the conductive substrate.

14. A method of manufacturing a field emission-type electron source including:
a conductive substrate;
a semiconductor layer formed on a surface of the conductive substrate, which includes a porous semiconductor layer with average thickness smaller than or equal to 2 μm in which columnar structures and porous structures composed of fine semiconductor crystals of nanometer scale coexist, a surface of each of the structures being covered with an insulating film; and
a conductive thin film formed on the semiconductor layer, in which electrons injected into the conductive substrate are emitted from the conductive thin film through the semiconductor layer by applying a voltage between the conductive thin film and the conductive substrate in such a manner that the conductive thin film acts as a positive electrode against the conductive substrate: the method comprising the step of:
making the semiconductor layer porous by means of an anodic oxidation process to form the porous semiconductor layer, wherein thickness of the porous semiconductor layer is controlled by means of an amount of electric charges during a period that the semiconductor layer acts as a positive electrode in the step.

15. The method of manufacturing the field emission-type electron source according to claim 14, wherein a pulse current or pulse voltage is applied between a counter electrode and the conductive substrate on which the semiconductor layer to be made porous is formed in such a manner that a period that the conductive substrate acts as a positive electrode and a period that the current or voltage is off state are mutually set, while thickness of the porous semiconductor layer is controlled by changing an amount of electric charges during the period that the semiconductor layer acts as the positive electrode.

16. The method of manufacturing the field emission-type electron source according to claim 14, wherein a pulse current or pulse voltage is applied between a counter electrode and the conductive substrate on which the semiconductor layer to be made porous is formed in such a manner that a period that the conductive substrate acts as a positive electrode and a period that the conductive substrate acts as a negative electrode are mutually set, while thickness of the porous semiconductor layer is uniformed by changing an amount of electric charges per one pulse during the period that the semiconductor layer acts as the negative electrode.

17. A method of manufacturing a field emission-type electron source including:
a conductive substrate;
a semiconductor layer formed on a surface of the conductive substrate, which includes a porous semiconductor layer with average thickness smaller than or equal to 2 μm in which columnar structures and porous structures composed of fine semiconductor crystals of nanometer scale coexist, a surface of each of the structures being covered with an insulating film; and
a conductive thin film formed on the semiconductor layer, in which electrons injected into the conductive substrate are emitted from the conductive thin film through the semiconductor layer by applying a voltage between the conductive thin film and the conductive substrate in such a manner that the conductive thin film acts as a positive electrode against the conductive substrate, wherein
a low-resistance layer of predetermined thickness is provided on a thin film side end portion of the porous semiconductor layer in the thickness direction of the semiconductor layer, the low-resistance layer having a smaller porosity and a lower resistance in comparison with other parts or the porous semiconductor layer, the method comprising the steps of:
forming the porous semiconductor layer by decreasing the porosity of a surface portion of the semiconductor layer in comparison with the porosity of other parts of the semiconductor layer, after the semiconductor layer has been formed on the conductive substrate;
forming the porous semiconductor layer including the low-resistance layer by oxidizing or nitrifying the porous semiconductor layer; and
forming the conductive thin film on the porous semiconductor layer.

18. The method of manufacturing the field emission-type electron source according to claim 17, wherein the semiconductor layer is made porous by means of an anodic oxidation process, a current density being set to a smaller value during a predetermined initial period of the anodic oxidation process, and the current density being set to a larger value after the predetermined initial period.

19. The method of manufacturing the field emission-type electron source according to claim 17, wherein the semiconductor layer is made porous by means of an anodic oxidation process, a light power applied to a surface of the semiconductor layer being smaller during a predetermined initial period of the anodic oxidation process, and the light power being larger after the predetermined initial period.

20. A method of manufacturing a field emission-type electron source including:
a conductive substrate;
a semiconductor layer formed on a surface of the conductive substrate, which includes a porous semiconductor layer with average thickness smaller than or equal to 2 μm in which columnar structures and porous structures composed of fine semiconductor crystals of nanometer scale coexist, a surface of each of the structures being covered with an insulating film; and
a conductive thin film formed on the semiconductor layer, in which electrons injected into the conductive substrate are emitted from the conductive thin film through the semiconductor layer by applying a voltage between the conductive thin film and the conductive substrate in such a manner that the conductive thin film acts as a positive electrode against the conductive substrate, wherein
a low-resistance layer of predetermined thickness is provided on a thin film side end portion of the porous semiconductor layer in the thickness direction of the semiconductor layer, the low-resistance layer, which has a lower resistance in comparison with other parts of the porous semiconductor layer, being composed of a re-crystallized layer formed by re-crystallizing a surface portion of the porous semiconductor layer, the method comprising the steps of:
forming the porous semiconductor layer by making the semiconductor layer porous, after the semiconductor layer has been formed on the conductive substrate;
re-crystallizing the surface portion of the porous semiconductor layer by means of a laser anneal process;

forming the porous semiconductor layer including the low-resistance layer by oxidizing or nitrifying the porous semiconductor layer; and forming the conductive thin film on the porous semiconductor layer.

21. A method of manufacturing a field emission-type electron source including:

a conductive substrate;

a semiconductor layer formed on a surface of the conductive substrate, which includes a porous semiconductor layer with average thickness smaller than or equal to 2 µm in which columnar structures and porous structures composed of fine semiconductor crystals of nanometer scale coexist, a surface of each of the structures being covered with an insulating film; and a conductive thin film formed on the semiconductor layer, in which electrons injected into the conductive substrate are emitted from the conductive thin film through the semiconductor layer by applying a voltage between the conductive thin film and the conductive substrate in such a manner that the conductive thin film acts as a positive electrode against the conductive substrate, wherein a low-resistance layer of predetermined thickness is provided on a thin film side end portion of the porous semiconductor layer in the thickness direction of the semiconductor layer, the low-resistance layer, which has a lower resistance in comparison with other parts of the porous semiconductor layer, being composed of an impurity-implanted layer formed by implanting impurity ions into the porous semiconductor layer, the method comprising the steps of:

forming the porous semiconductor layer by making the semiconductor layer porous, after the semiconductor layer has been formed on the conductive substrate;

implanting the impurity ions into the porous semiconductor layer from a surface side of the porous semiconductor layer by means of an ion implantation process;

forming the porous semiconductor layer including the low-resistance layer by oxidizing or nitrifying the porous semiconductor layer; and forming the conductive thin film on the porous semiconductor layer.

22. A method of manufacturing a field emission-type electron source including:

a conductive substrate;

a semiconductor layer formed on a surface of the conductive substrate, which includes a porous semiconductor layer with average thickness smaller than or equal to 2 µm in which columnar structures and porous structures composed of fine semiconductor crystals of nanometer scale coexist, a surface of each of the structures being covered with an insulating film; and a conductive thin film formed on the semiconductor layer, in which electrons injected into the conductive substrate are emitted from the conductive thin film through the semiconductor layer by applying a voltage between the conductive thin film and the conductive substrate in such a manner that the conductive thin film acts as a positive electrode against the conductive substrate, wherein a low-resistance layer of predetermined thickness is provided on a thin film side end portion of the porous semiconductor layer in the thickness direction of the semiconductor layer, the low-resistance layer, which has a lower resistance in comparison with other parts of the porous semiconductor layer, being composed of an impurity-diffused layer formed by diffusing an impurity into the porous semiconductor layer, the method comprising the steps of:

forming the porous semiconductor layer by making the semiconductor layer porous, after the semiconductor layer has been formed on the conductive substrate;

diffusing the impurity into the porous semiconductor layer from a surface of the porous semiconductor layer by means of a thermal diffusion process;

forming the porous semiconductor layer including the low-resistance layer by oxidizing or nitrifying the porous semiconductor layer; and forming the conductive thin film on the porous semiconductor layer.

23. A method of manufacturing a field emission-type electron source including:

a conductive substrate;

a semiconductor layer formed on a surface of the conductive substrate, which includes a porous semiconductor layer with average thickness smaller than or equal to 2 µm in which columnar structures and porous structures composed of fine semiconductor crystals of nanometer scale coexist, a surface of each of the structures being covered with an insulating film; and a conductive thin film formed on the semiconductor layer, in which electrons injected into the conductive substrate are emitted from the conductive thin film through the semiconductor layer by applying a voltage between the conductive thin film and the conductive substrate in such a manner that the conductive thin film acts as a positive electrode against the conductive substrate: the method comprising the step of:

forming the porous semiconductor layer in which a surface of each of the porous structures is parallel to a surface of the conductive substrate by performing an anodic oxidation process to the semiconductor layer, after the surface of the semiconductor layer has been smoothed.

* * * * *

UNITED STATES PATENT AND TRADEMARK OFFICE
CERTIFICATE OF CORRECTION

PATENT NO.    : 6,498,426 B1
DATED         : December 24, 2002
INVENTOR(S)   : Y. Watabe et al.

It is certified that error appears in the above-identified patent and that said Letters Patent is hereby corrected as shown below:

<u>Column 38,</u>
Line 9, "or" should be -- of --.

Signed and Sealed this

Ninth Day of September, 2003

JAMES E. ROGAN
*Director of the United States Patent and Trademark Office*